United States Patent
Lee et al.

(10) Patent No.: US 8,618,244 B2
(45) Date of Patent: Dec. 31, 2013

(54) PREPARATION METHOD OF POLYBENZOXAZOLES BY THERMAL REARRANGEMENT, POLYBENZOXAZOLES PREPARED THEREBY, AND GAS SEPARATION MEMBRANE COMPRISING THE SAME

(75) Inventors: Young Moo Lee, Seoul (KR); Keun-Young Kim, Seoul (KR); Chul-Ho Jung, Gwangju (KR); Ho-Bum Park, Seoul (KR)

(73) Assignee: Industry-University Cooperation Foundation, Hanyang University, Seoul (KR)

( * ) Notice: Subject to any disclaimer, the term of this patent is extended or adjusted under 35 U.S.C. 154(b) by 197 days.

(21) Appl. No.: 12/921,980

(22) PCT Filed: Mar. 13, 2008

(86) PCT No.: PCT/KR2008/001419
§ 371 (c)(1),
(2), (4) Date: Sep. 10, 2010

(87) PCT Pub. No.: WO2009/113747
PCT Pub. Date: Sep. 17, 2009

(65) Prior Publication Data
US 2011/0009506 A1 Jan. 13, 2011

(30) Foreign Application Priority Data
Mar. 12, 2008 (KR) .................. 10-2008-0022970

(51) Int. Cl.
*C08G 73/22* (2006.01)
*C08G 73/06* (2006.01)
*C08G 61/12* (2006.01)
*B01D 69/02* (2006.01)
*B01D 71/62* (2006.01)

(52) U.S. Cl.
USPC ........... 528/424; 528/423; 528/184; 528/185; 528/310; 528/322; 528/370; 528/371; 528/372; 528/503

(58) Field of Classification Search
USPC ......... 528/176, 179, 183, 184, 185, 310, 322, 528/272, 288, 503, 424, 423, 370, 371, 372
See application file for complete search history.

(56) References Cited

U.S. PATENT DOCUMENTS 3,332,907 A   7/1967 Angelo et al.

FOREIGN PATENT DOCUMENTS

GB   2211193   6/1989

OTHER PUBLICATIONS

Steve Lien-Chung Hsu et al., Synthesis and properties of polybenzoxazole-clay nanocomposites, Polymer 43, 2002, p. 4097-4101.
Arthur J. Garvin et al., Synthesis and characterization of the polyhydroxyamide/polymethoxyamide family of polymers, High Performance Polymers, 2003, vol. 15, pp. 519-535.
W. D. Joseph et al., Synthesis and characterization of fluorinated polybenzoxazoles via solution cyclization techniques, Polymer, vol. 35, No. 23, 5046-5050, 1994, VA, USA.

*Primary Examiner* — Duc Truong
(74) *Attorney, Agent, or Firm* — Lexyoume IP Meister, PLLC

(57) ABSTRACT

Disclosed herein are a method for preparing a benzoxazole-based polymer by thermal rearrangement, the benzoxazole-based polymer prepared by the method and a gas separation membrane comprising the polymer. More specifically, provided are a method for preparing a benzoxazole-based polymer by subjecting poly(hydroxyamide) as an intermediate to thermal treatment involving dehydration, the benzoxazole-based polymer obtained thereby and gas separation membrane comprising the polymer. The benzoxazole-based polymer of the present invention can be simply prepared by thermally rearrangement via thermal treatment at low temperatures, and thus exhibits superior mechanical and morphological properties and has well-connected microcavities. Due to showing excellent permeability and selectivity for various gases, the benzoxazole-based polymer is suited for application to gas separation membranes, in particular, gas separation membranes for small gases.

13 Claims, 7 Drawing Sheets

PREPARATION METHOD OF POLYBENZOXAZOLES BY THERMAL REARRANGEMENT, POLYBENZOXAZOLES PREPARED THEREBY, AND GAS SEPARATION MEMBRANE COMPRISING THE SAME

TECHNICAL FIELD

The present invention relates to a method for preparing a benzoxazole-based polymer by thermal rearrangement which is performed by a simple process and induces thermal rearrangement at relatively lower thermal conversion temperatures to prepare a benzoxazole-based polymer suited for application to gas separation membranes, in particular, to gas separation membranes for small gases, the benzoxazole-based polymer prepared by the method and a gas separation membrane comprising the benzoxazole-based polymer.

BACKGROUND ART

Free-volume elements in soft organic materials have been focused upon to improve membrane separation performance in chemical products as well as for energy conversion and storage applications [P. M. Budd, N. B. McKeown, D. Fritsch, Polymers with cavities tuned for fast selective transport of small molecules and ions, *J. Mater. Chem.* 2005, 15, 1977; W. J. Koros, Fleming G. K., Membrane-based gas separation, *J. Membr. Sci.* 1993, 83, 1; S. A. Stern, Polymers for gas separations: The next decade, *J. Membr. Sci.* 1994, 94, 1].

The free volume element size and distribution play a key role in determining permeability and separation characteristics of polymers. Among typical polymeric membranes, glassy polymers have exhibited good gas separation performance with high selectivity, however, permeability of glassy polymers is poorly suited to practical applications [M. Langsam, "Polyimide for gas separation, in Polyimides: fundamentals and applications", Marcel Dekker, New York, 1996; B. D. Freeman, Basis of permeability/selectivity tradeoff relations in polymeric gas separation membranes, *Macromolecules* 1999, 32, 375].

Even though some glassy polymers with ultra-high free volume such as poly(1-trimethylsilyl-1-propyne) (PTMSP), poly(4-methyl-2-pentyne) (PMP), and copolymers of 2,2-bis-trifluoromethyl-4,5-difluoro-1,3-dioxide and tetrafluoroethylene (amorphous Teflons AF) exhibited extremely high gas permeability, they still had very low performance in selectivities. [K. Nagai, T. Masuda, T. Nakagawa, B. D. Freeman, I. Pinnau, Poly[1-(trimethylsilyl)-1-propyne] and related polymers: Synthesis, properties and functions, *Prog. Polym. Sci.* 2001, 26, 721; A. Morisato, I. Pinnau, Synthesis and gas permeation properties of poly(4-methyl-2-pentyne), *J. Membr. Sci.* 1996, 121, 243; A. M. Polyakov, L. E. Starannikova, Y. P. Yampolskii, Amorphous Teflons AF as organophilic pervaporation materials: Transport of individual components, J. Membr. Sci. 2003, 216, 241].

A great deal of research has endeavored to produce ideal structures having precise cavities for high gas permeability and high gas selectivity. As a result of this research, there has been remarkable development of polymer membranes exhibiting high gas-separation performance. For example, designs for nanocomposites, hybrid materials and complex polymers were considered to impart large free volume to polymers.

Of these, methods to realize intermediate and small cavity size distributions were reported recently [H. B. Park, C. H. Jung, Y. M. Lee, A. J. Hill, S. J. Pas, S. T. Mudie, E. Van Wagner, B. D. Freeman, D. J. Cookson, Polymers with cavities tuned for fast selective transport of small molecules and ions, *Science* 2007, 318, 254. 38].

Lee et al. suggested that completely aromatic, insoluble, infusible polybenzoxazole (TR-α-PBO) membranes can be prepared by thermally modifying ortho-hydroxyl group-containing polyimide aromatic polymers through thermal rearrangement to molecular rearrangement at 350 to 450° C. [H. B. Park, C. H. Jung, Y. M. Lee, A. J. Hill, S. J. Pas, S. T. Mudie, E. Van Wagner, B. D. Freeman, D. J. Cookson, Polymers with cavities tuned for fast selective transport of small molecules and ions, *Science* 2007, 318, 254. 38].

TR-α-PBO membranes have advantages of excellent gas separation performance and superior chemical stability and mechanical properties, surpassing the limitations of typical polymeric membranes (i.e., the Robeson's upper bound). [L. M. Robeson, Correlation of separation factor versus permeability for polymeric membranes, *J. Membr. Sci.*, 1991, 62, 165, L. M. Robeson, The upper bound revisited, *J. Membr. Sci.*, 2008, 320, 390]. However, in spite of extremely high permeability in $CO_2$ separation, TR-α-PBO still exhibits low selectivity for small gases such as hydrogen and helium.

DISCLOSURE

Technical Problem

Therefore, it is one object of the present invention to provide a method for preparing a benzoxazole-based polymer, wherein the method is performed by a simple process and induces thermal rearrangement at relatively lower temperatures.

It is another object of the present invention to provide a poly(hydroxyamide) intermediate suitable for the preparation of the benzoxazole-based polymer.

It is another object of the present invention to provide polybenzoxazole (TR-β-PBO) having morphological and physical properties different from conventional polybenzoxazole (TR-α-PBO).

It is another object of the present invention to provide a poly(hydroxyamide)(PHA) intermediate suitable for the preparation of the polybenzoxazole (TR-β-PBO).

It is another object of the present invention to provide a gas separation membrane comprising the polybenzoxazole (TR-β-PBO) with high permeability and superior selectivity for small gases.

Technical Solution

In accordance with one aspect of the present invention for achieving the above object, there is provided a method for preparing a benzoxazole-based polymer represented by Formula 1, by thermally treating poly(hydroxyamide) represented by Formula 2, as depicted in Reaction Scheme 1 below:

Reaction Scheme 1

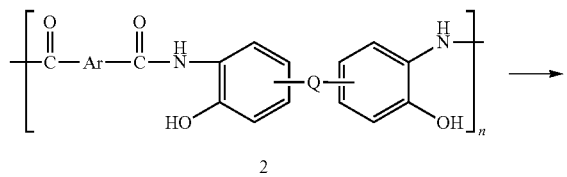

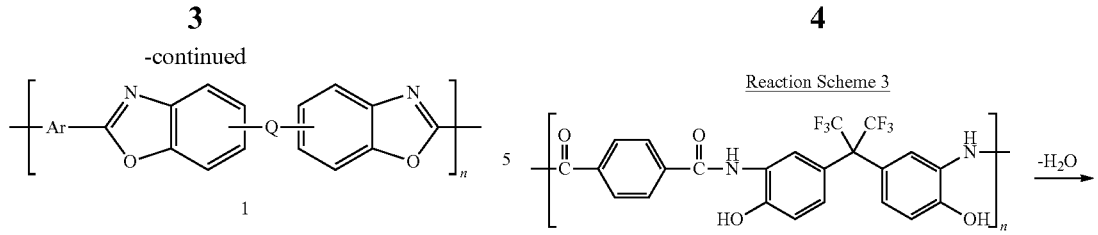

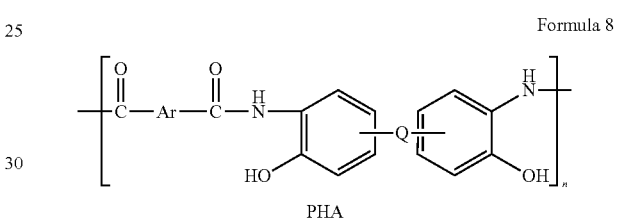

8 PHA

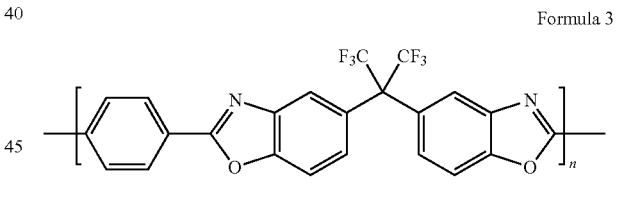

3 TR-β-PBO

In accordance with another aspect of the present invention, there is provided a poly(hydroxyamide) intermediate represented by the following Formula 8 used for the preparation of the polybenzoxazole (TR-β-PBO).

Formula 8

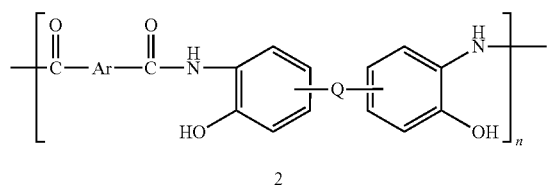

PHA

In accordance with another aspect of the present invention, there is provided a gas separation membrane comprising polybenzoxazole (TR-β-PBO) represented by Formula 3 and having a glass transition temperature (Tg) of 377° C.

Formula 3

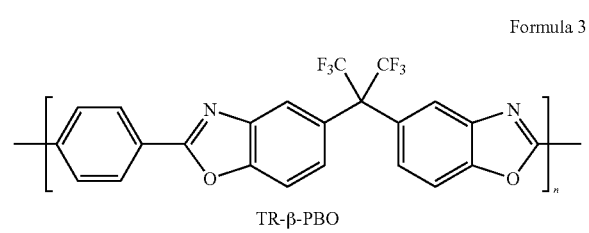

TR-β-PBO

Advantageous Effects

According to the method of the present invention, polybenzoxazole is simply prepared by thermally converting poly(hydroxyamide) as an intermediate via thermal treatment at low temperatures. The polybenzoxazole thus prepared exhibits superior mechanical and morphological properties and has well-connected microcavities, thus showing excellent permeability and selectivity for various types of gases.

The polybenzoxazole is suited for application to gas separation membranes, in particular, gas separation membranes for small gases, e.g. $H_2/CH_4$, $H_2/CO_2$, $H_2/N_2$, $He/N_2$, $O_2/N_2$, $CO_2/N_2$, and $CO_2/CH_4$.

DESCRIPTION OF DRAWINGS

The above and other objects, features and other advantages of the present invention will be more clearly understood from wherein Ar is a bivalent $C_5$-$C_{24}$ arylene group or a bivalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring, or covalently bonded to each other via a functional group selected from the group consisting of O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$ and C(=O)NH;

Q is O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$, C(=O)NH, C(CH$_3$(CF$_3$), $C_1$-$C_6$ alkyl-substituted phenyl or $C_1$-$C_6$ haloalkyl-substituted phenyl in which Q is linked to opposite both phenyl rings in the position of m-m, m-p, p-m or p-p; and n is an integer of 20 to 200.

In accordance with another aspect of the present invention, there is provided a poly(hydroxyamide) intermediate represented by Formula 2 used in the preparation of the benzoxazole-based polymer Formula 1.

Formula 2

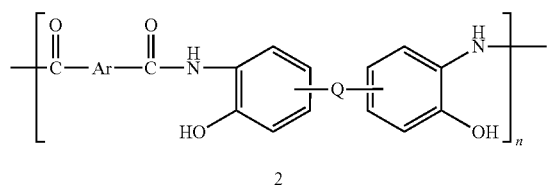

wherein Ar, Q and n are defined as above.

In accordance with another aspect of the present invention, there is provided polybenzoxazole (TR-β-PBO) represented by Formula 3, having a glass transition temperature (Tg) of 377° C. and a d-spacing of 6.0 to 6.10 Å.

Formula 3

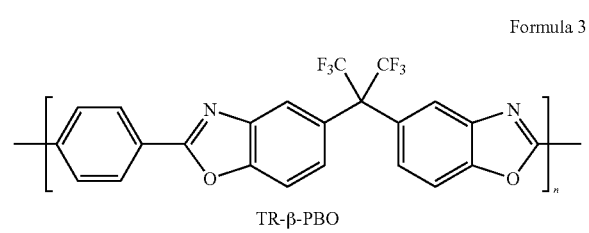

TR-β-PBO

Figure 1:
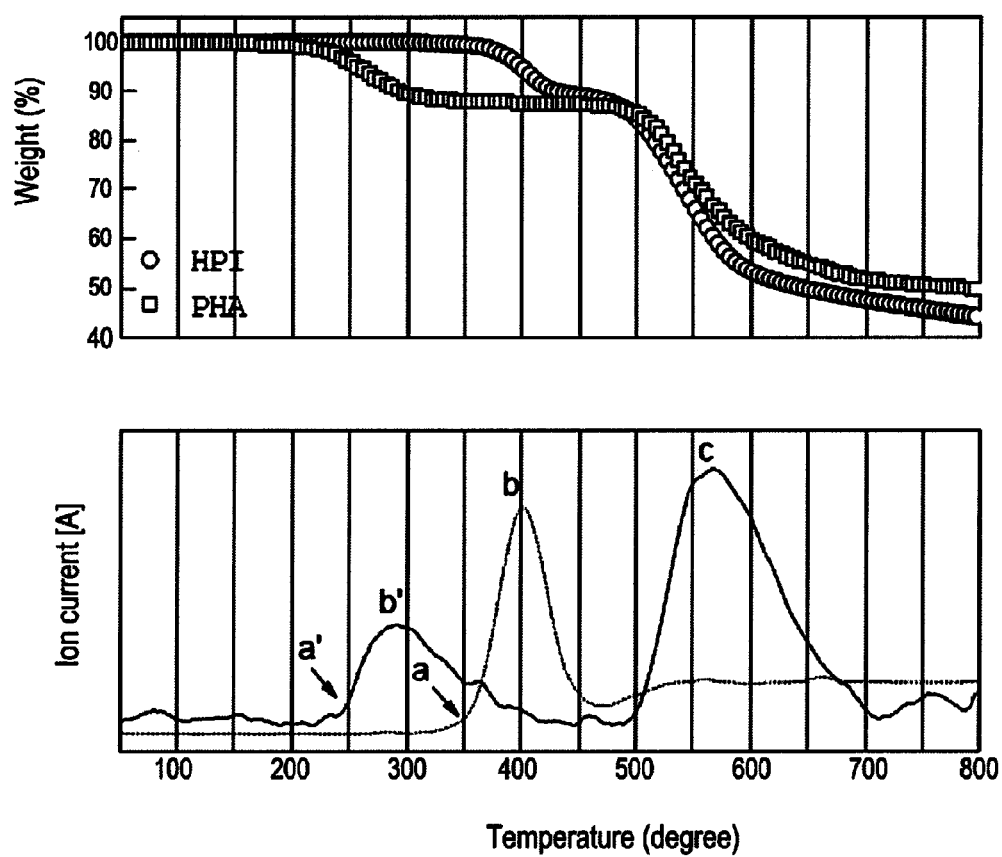
Figure 2:
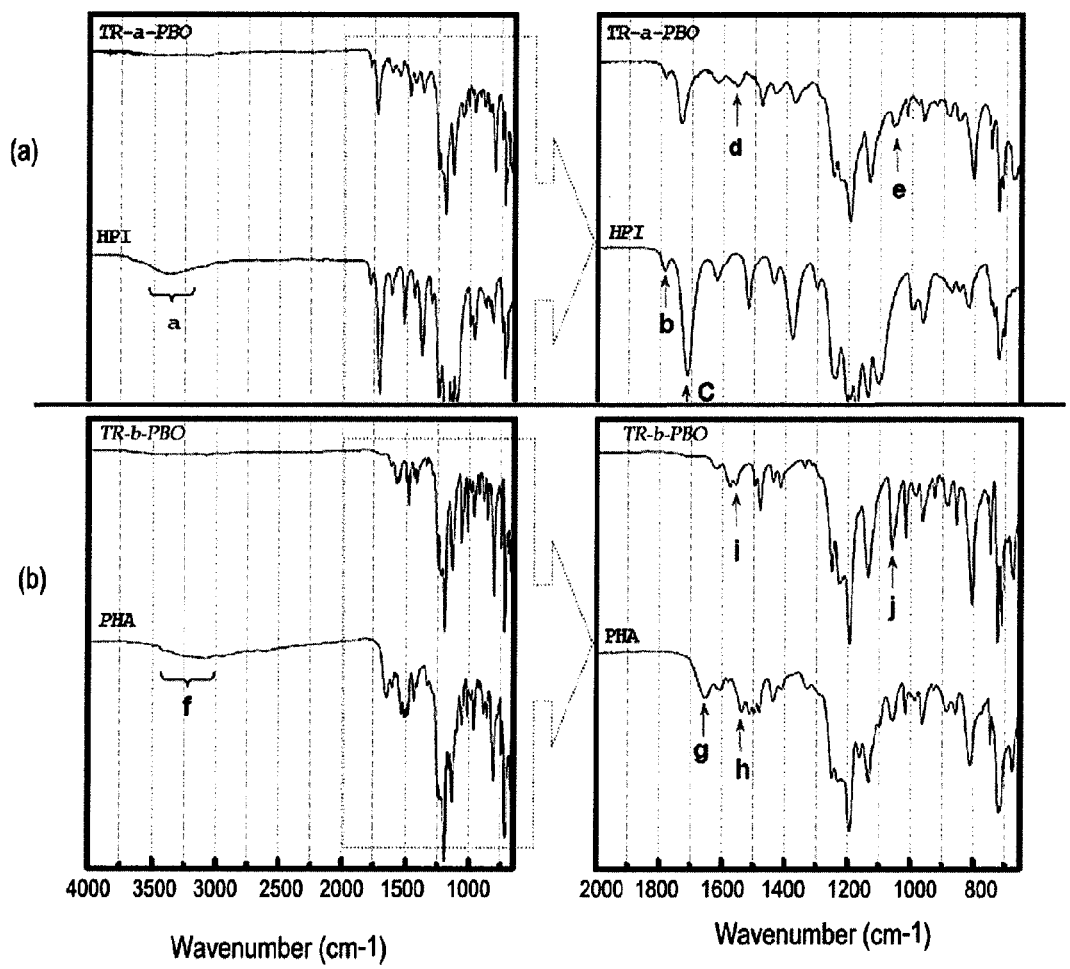
Figure 3:
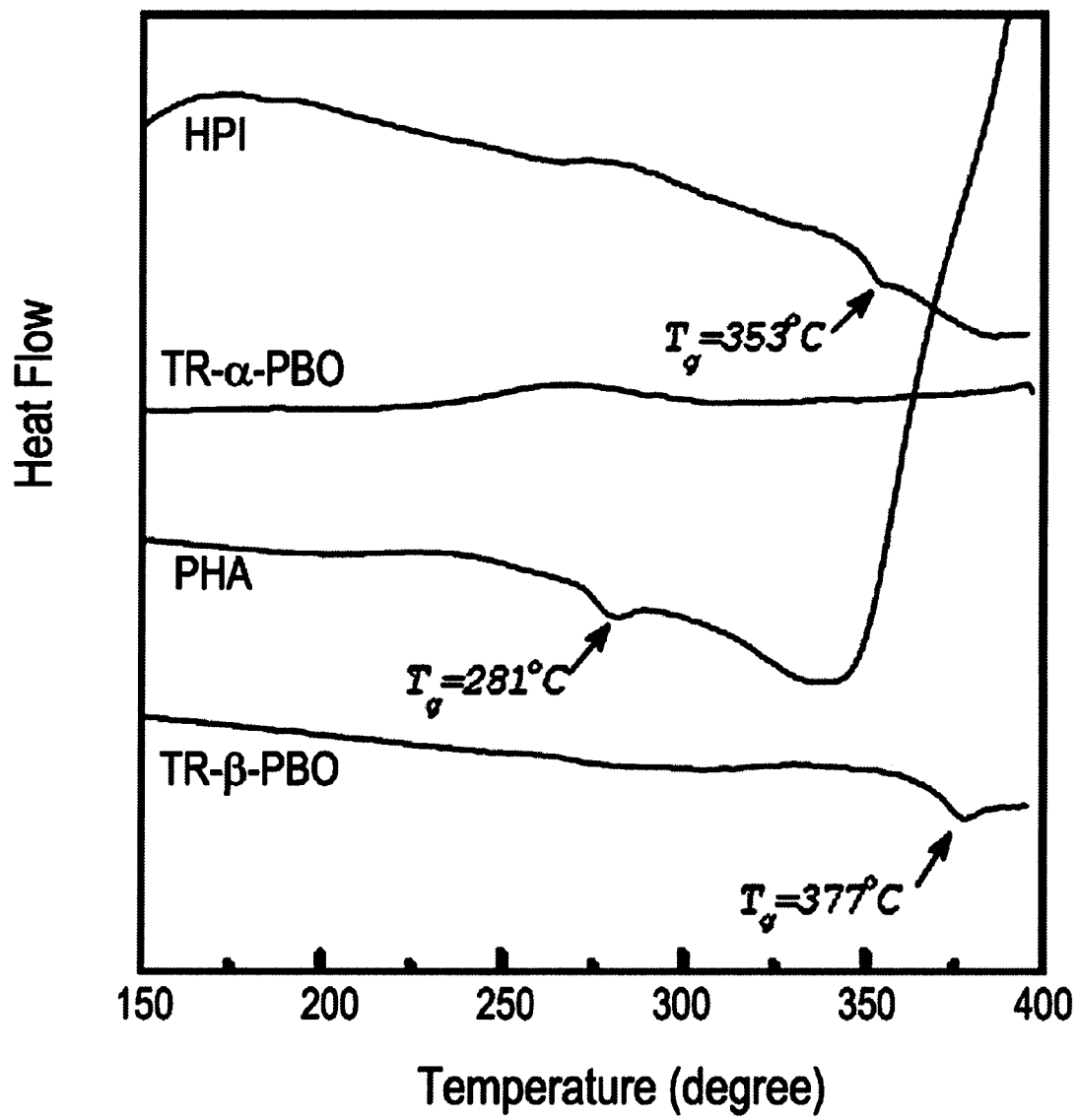
Figure 6:
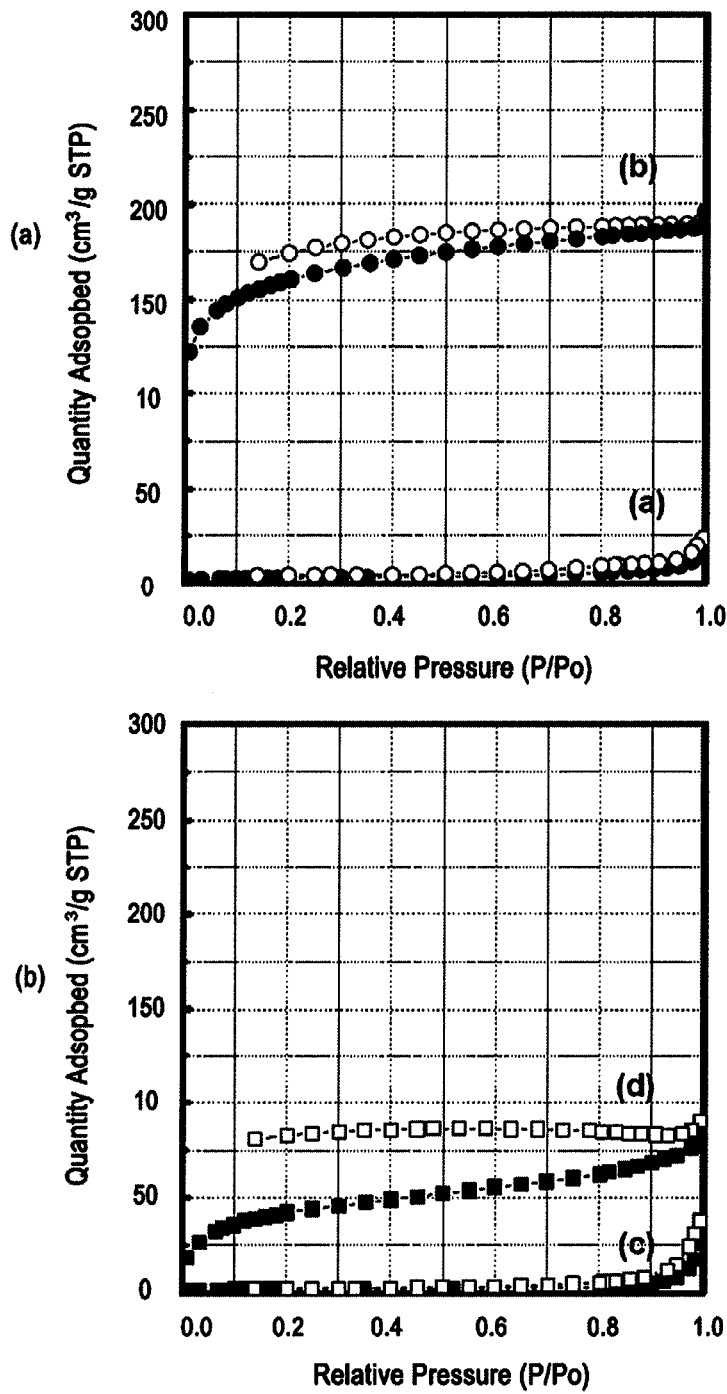
Figure 7:
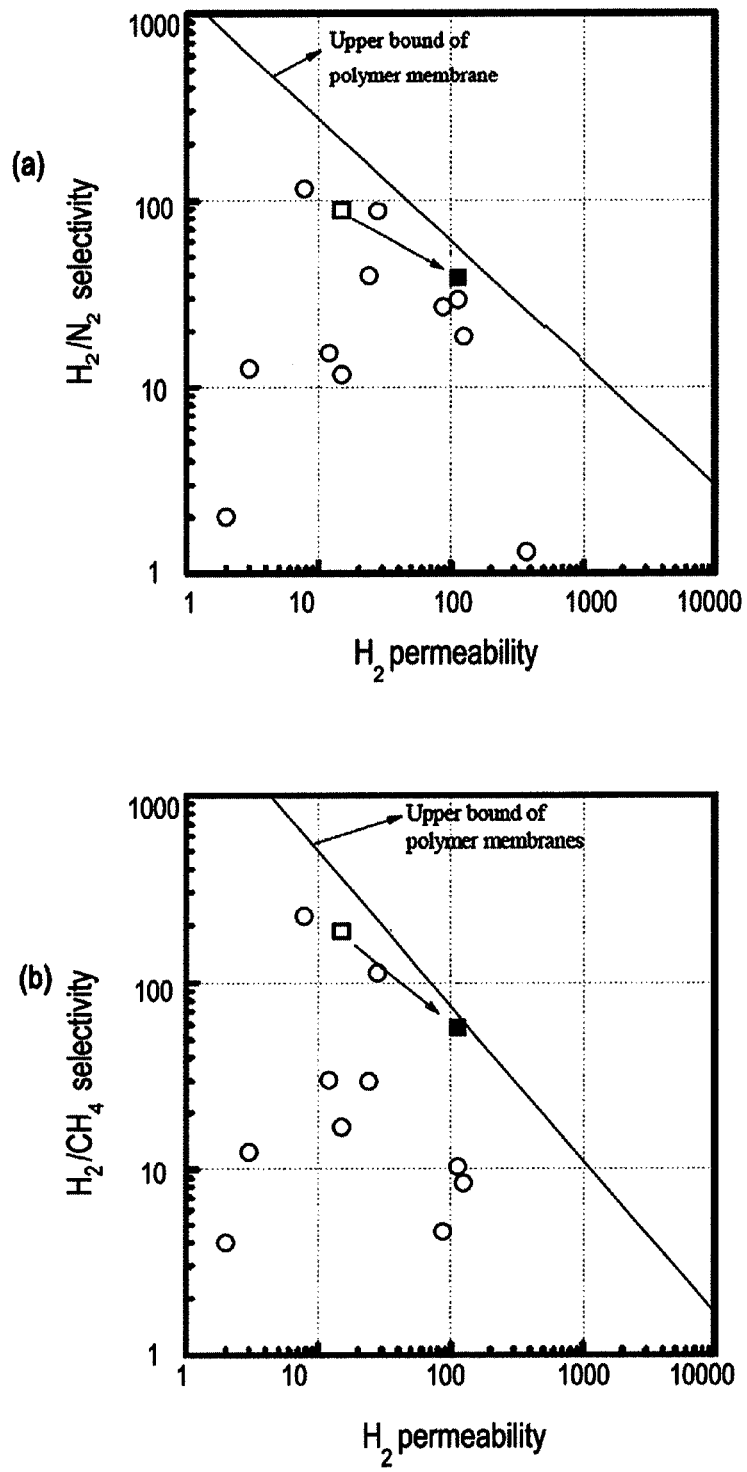

In accordance with another aspect of the present invention, there is provided a method for preparing polybenzoxazole (TR-β-PBO, 3) by thermally treating poly(hydroxyamide) (PHA, 8), as depicted in Reaction Scheme 3 below:

the following detailed description taken in conjunction with the accompanying drawings, in which:

FIG. 1 is graphs showing TGA-MS results of the PHA precursor membrane of Example 1 and the HPI precursor membrane of Comparative Example 1;

FIG. 2(a) is FT-IR spectra of the HPI precursor membrane and the TR-α-PBO membrane of Comparative Example 1 and FIG. 2(b) is FT-IR spectra of the PHA precursor membrane and TR-β-PBO membrane of Example 1;

FIG. 3 is DSC thermograms of the PHA precursor membrane and the TR-β-PBO membrane Example 1 and the HPI precursor membrane and the TR-α-PBO membrane of Comparative Example 1;

FIG. 4(a) is X-ray diffraction patterns of the HPI precursor membrane and the TR-α-PBO membrane of Comparative Example 1 and FIG. 4(b) is X-ray diffraction patterns of the PHA precursor membrane and the TR-β-PBO membrane of Example 1;

FIG. 5(a) is adsorption isotherms of constant-pressure simulations for $O_2$ and FIG. 5(b) is adsorption isotherms of constant-pressure simulations for $N_2$;

FIG. 6 is $N_2$ adsorption/desorption isotherms at −195° C. for the HPI precursor membrane (a) and the TR-α-PBO membrane (b) of Comparative Example 1, and the PHA precursor membrane (c) and TR-β-PBO membrane (d) of Example 1; and FIG. 7(a) is a graph showing $H_2$ permeability-$H_2$/$N_2$ selectivity of the TR-β-PBO membrane and conventional polymer membranes and FIG. 7(b) is a graph showing $H_2$ permeability-$H_2$/$CH_4$ selectivity of the TR-β-PBO membrane and conventional polymer membranes.

BEST MODE

Hereinafter, the present invention will be illustrated in more detail.

The preparation method of the present invention comprises thermally converting poly(hydroxyamide) into polybenzoxazole through thermal treatment involving dehydration.

Specifically, the poly(hydroxyamide) represented by Formula 2 as a precursor is converted into the benzoxazole-based polymer represented by Formula 1, as depicted in Reaction Scheme 1 below:

Reaction Scheme 1

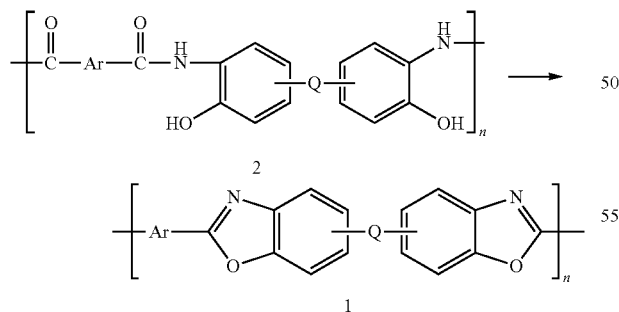

wherein Ar is a bivalent $C_5$-$C_{24}$ arylene group or a bivalent $C_5$-$C_{24}$ heterocyclic ring, which is substituted or unsubstituted with at least one substituent selected from the group consisting of $C_1$-$C_{10}$ alkyl, $C_1$-$C_{10}$ alkoxy, $C_1$-$C_{10}$ haloalkyl and $C_1$-$C_{10}$ haloalkoxy, or two or more of which are fused together to form a condensation ring, or covalently bonded to each other via a functional group selected from the group consisting of O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$ and C(=O)NH;

Q is O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$, C(=O)NH, C(CH$_3$)(CF$_3$), $C_1$-$C_6$ alkyl-substituted phenyl or $C_1$-$C_6$ haloalkyl-substituted phenyl in which Q is linked to opposite both phenyl rings in the position of m-m, m-p, p-m or p-p; and n is an integer of 20 to 200.

Preferably, Ar is selected from the following compounds and the linkage position thereof includes all of o-, m- and p-positions.

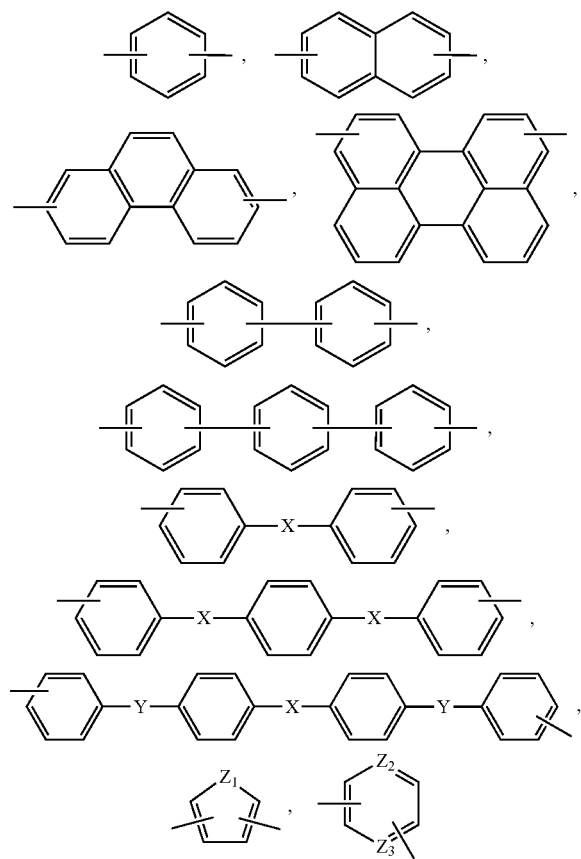

wherein X is O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$, or C(=O)NH; Y is O, S or C(=O); and $Z_1$, $Z_2$ and $Z_3$ are identical or different and are O, N or S.

More preferably, Ar is selected from the following compounds:

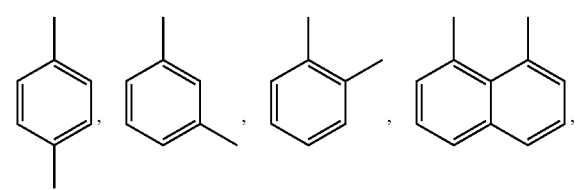

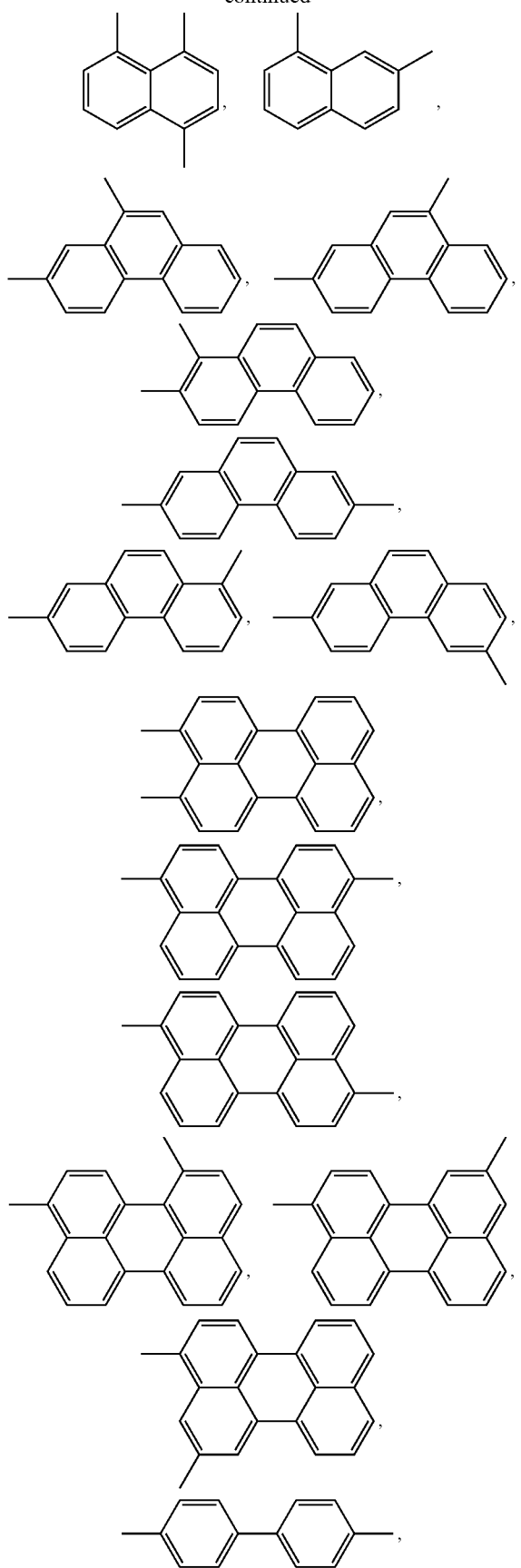
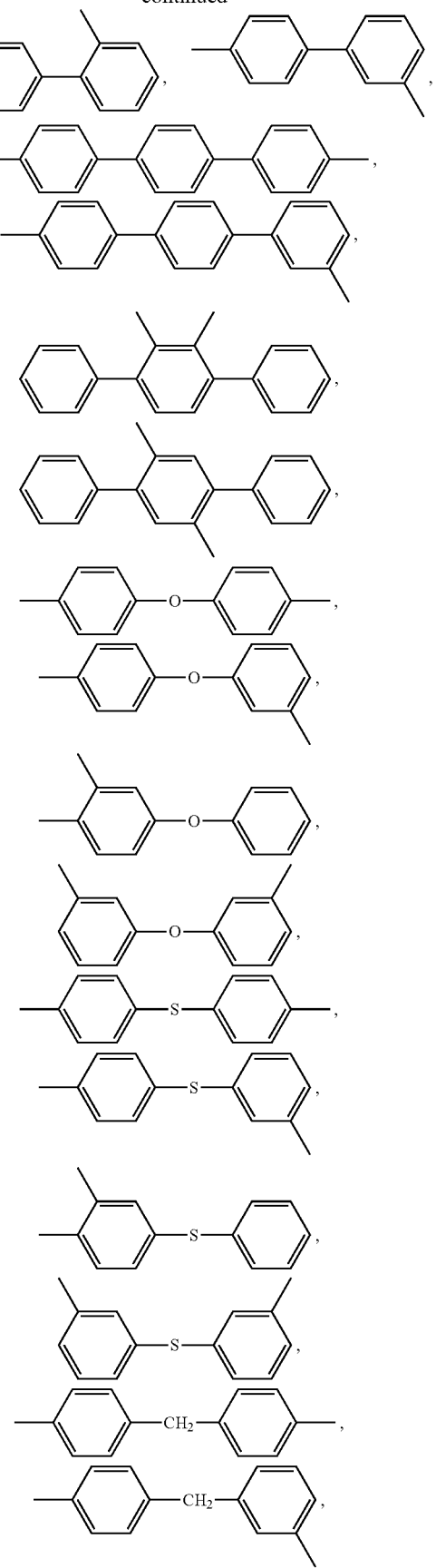

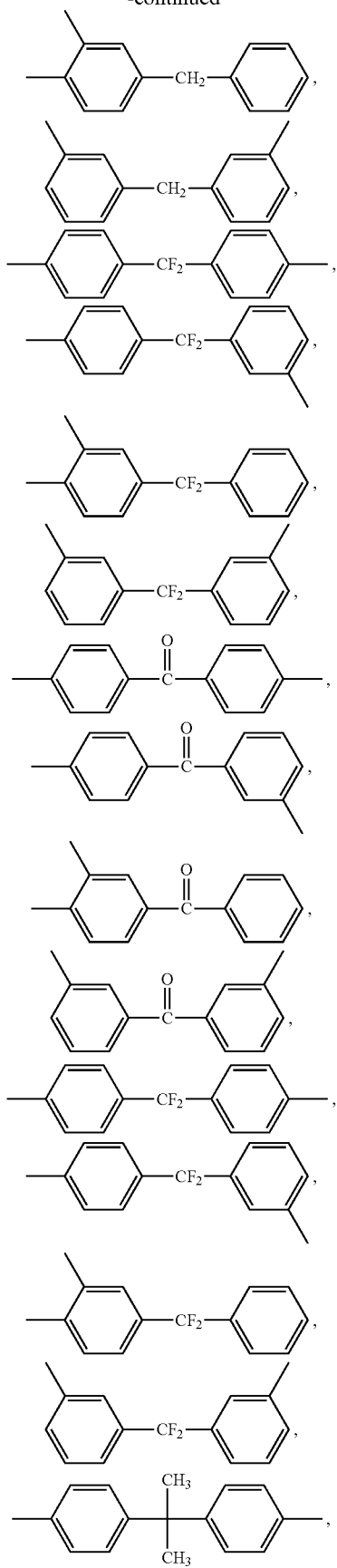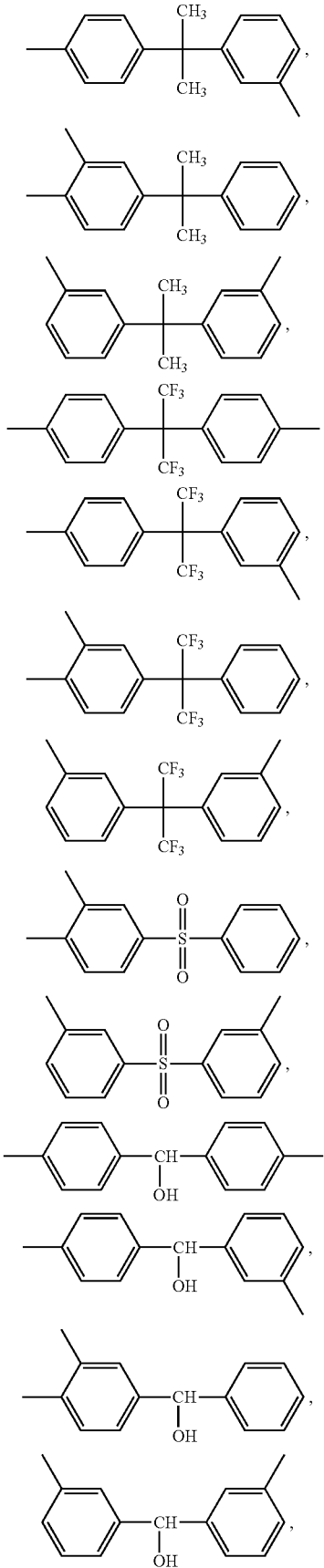

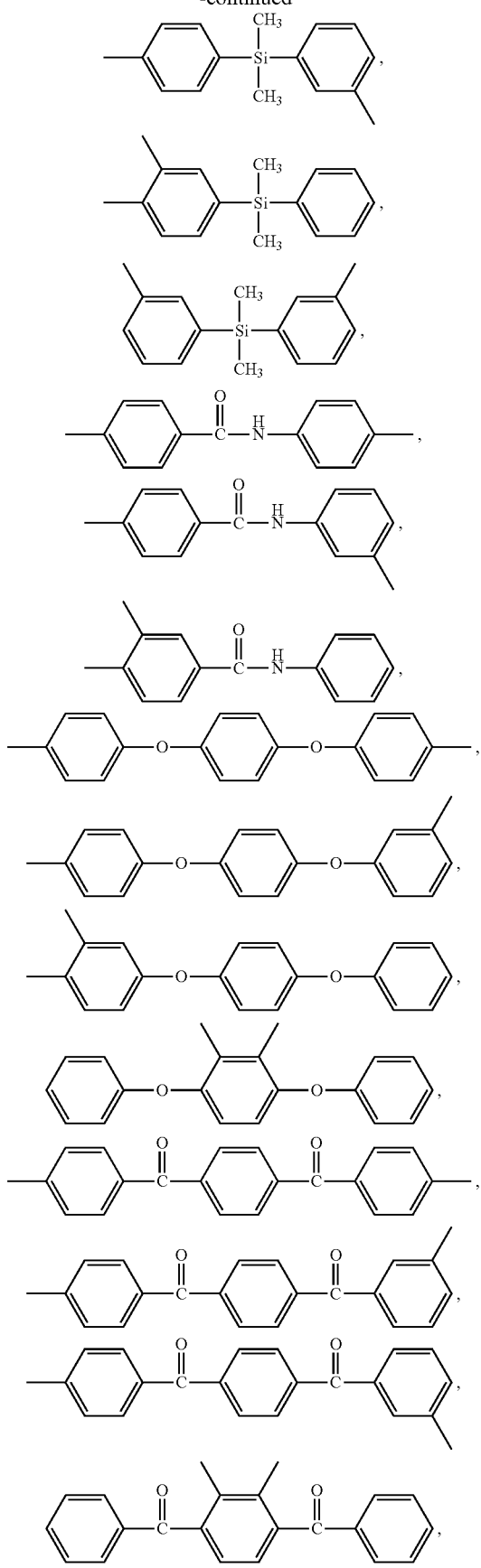
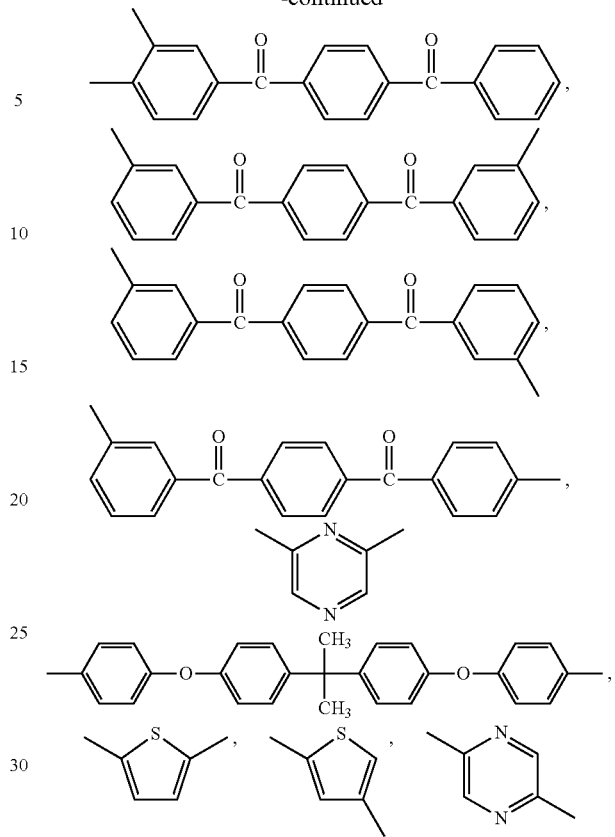
In Formula 1, Q is $C(CH_3)_2$, $C(CF_3)_2$, $C(=O)NH$, $C(CH_3)(CF_3)$,
or
More preferably, Ar is
and Q is $C(CF_3)_2$.
As can be seen from Reaction Scheme 1, the poly(hydroxyamide) 2 as a precursor is converted into the benzoxazole-based polymer 1. The conversion of the poly(hydroxyamide) 2 into the benzoxazole-based polymer 1 is carried out by dehydration, namely, removal of $H_2O$ present in the poly (hydroxyamide) 2.

After the thermal rearrangement through the thermal treatment, the benzoxazole-based polymer 1 undergoes morphological changes including reduced density, considerably increased fractional free volume (FFV) due to increased microcavity size and increased d-spacing, as compared to the precursor 2. As a result, the benzoxazole-based polymer 1 exhibits considerably high gas permeability, as compared to the precursor 2. In addition, the benzoxazole-based polymer 1 exhibits improved tensile strength and elongation.

These morphological properties can be readily controlled by a design taking into consideration the characteristics (e.g., steric hindrance) of Ar and Q, the functional groups present in the molecular structures, and permeability and selectivity for various types of gases can be thus controlled.

According to the present invention, the thermal treatment is carried out at 150 to 450° C., preferably 250 to 350° C., at a heating rate of 1 to 10° C./min for 5 minutes to 12 hours, preferably for 10 minutes to 2 hours, under an inert atmosphere. When the thermal treatment temperature is less than the level as defined the above, the thermal rearrangement is incomplete, thus leaving precursor residues, causing deterioration of purity. Increasing the thermal treatment temperature above the level defined above provides no particular advantage, thus being economically impractical. Accordingly, the thermal treatment is properly carried out within the temperature range as defined above.

At this time, the reaction conditions are properly controlled according to Ar and Q, the functional groups of the precursor, and specific conditions can be adequately selected and modified by those skilled in the art.

Preferably, the benzoxazole-based polymer 1 is designed in the preparation process such that it has a desired molecular weight. Preferably, the weight average molecular weight of the benzoxazole-based polymer 1 is adjusted to 10,000 to 50,000 Da. When the weight average molecular weight is less than 10,000 Da, physical properties of the polymer are poor. When the weight average molecular weight exceeds 50,000 Da, the polymer is poorly soluble in solvents, thus complicating casting of the polymeric membrane.

In particular, the poly(hydroxyamide) 2 used as a precursor in the present invention is prepared by a conventional method.

For example, the poly(hydroxyamide) 2 is prepared by reacting the compound 4 with the compound 5, as depicted in Reaction Scheme 2 below:

Reaction Scheme 2

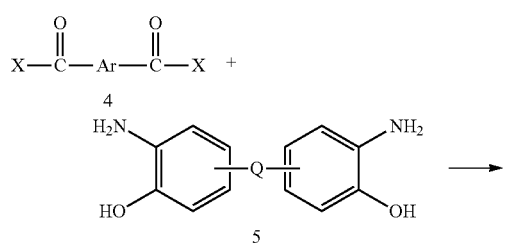

-continued

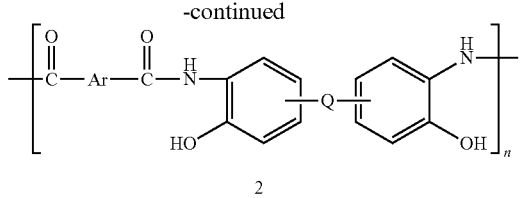

wherein X is a halogen atom, and Ar, Q and n are defined as above.

Preferably, the halogen atom is F, Cl, Br or I. More preferred is the use of Cl in view of its high reactivity.

For example, terephthaloyl chloride (TCL) and 2,2'-bis(3-amino-4-hydroxyphenyl)hexafluoropropane (bisAPAF) are used as the compounds of Formulae 4 and 5, respectively.

The compounds 4 and 5 are suitably selected in conformity with Ar and Q defined throughout the present specification. Taking stoichiometry into consideration, the compounds 4 and 5 are used in a desired molar ratio, preferably, in the range of 1:1 to 2:1, and more preferably, an excess of the compound 4 is used.

The reaction is carried out at −10 to 60° C. for 30 minutes to 12 hours until the reaction is fully completed.

Furthermore, an acid acceptor is added to capture HX (hydrogen halide, i.e. HCl) produced during the reaction. The acid acceptor is selected from the group consisting of ethylene oxide, propylene oxide, magnesium oxide, hydrotalcite, magnesium carbonate, calcium hydroxide, magnesium silicate and combinations thereof. Preferably, an excess of the acid acceptor is used, as compared to HX, the reaction product.

The benzoxazole-based polymer 1 prepared by the method of the present invention as mentioned above is suited for application to gas separation membranes due to superior gas permeability and selectivity thereof.

The present invention is not limited to the preparation method of the gas separation membrane. That is, the gas separation membrane can be prepared in the form of films or fibers (in particular, hollow fibers) by a conventional method e.g. casting or laminating.

For example, the gas separation membrane made of the benzoxazole-based polymer 1 is prepared by casting the precursor 2 onto a substrate, followed by thermal treatment, as depicted in Reaction Scheme 1.

The benzoxazole-based polymer-comprising gas separation membrane according to the present invention is prepared by preparing a polymer precursor and subjecting the precursor to thermal conversion involving dehydration. Accordingly, in terms of physical properties, the polybenzoxazole gas separation membrane according to the present invention is remarkably different from gas separation membranes made of polybenzoxazole (TR-α-PBO), which is prepared by preparing a conventional polymer precursor and subjecting the precursor to thermal treatment involving removal of $CO_2$.

First, glass transition temperatures (Tg, 400° C. or higher) of conventional polymers prepared through $CO_2$ removal are impossible to measure due to a rigid structure thereof, while Tg of the polybenzoxazole of the present invention is measured to be 377° C. (in the case of polybenzoxazole prepared in Example 1) due to its soft molecular structure, thus being preferably applicable to gas separation membranes.

Second, the gas separation membrane of the present invention is useful for gas separation membranes due to high tensile strength and elongation thereof (See Table 2).

Third, in terms of morphological properties, the gas separation membrane has well-connected microcavities and exhibits a superior fractional free volume, allowing gases to smoothly pass though the microcavities (good permeability).

Fourth, the gas separation membrane has a low d-spacing, thus exhibiting increased permselectivity for small gases.

Fifth, the gas separation membrane is useful as a gas separation membrane for gas pair such as $H_2/CH_4$, $H_2/CO_2$, $H_2/N_2$, $He/N_2$, $O_2/N_2$, $CO_2/N_2$, and $CO_2/CH_4$, preferably, as a gas separation membrane applicable to gas pair such as $H_2/CH_4$, $H_2/CO_2$, $H_2/N_2$ and $He/N_2$, including small gases such as $H_2$ or He. These gas separation membranes have high selectivity for small gases due to their polymeric microcavities.

Sixth, the benzoxazole-based polymer according to the present invention can be designed by modifying functional groups in the molecular structure thereof, thus being used to prepare various gas separation membrane products.

In a preferred embodiment of the present invention, the polybenzoxazole polymer is polybenzoxazole (TR-β-PBO) represented by Formula 3 below:

Formula 3

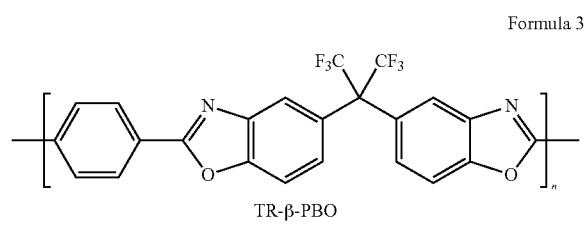

TR-β-PBO

The polybenzoxazole (TR-β-PBO, 3) is prepared by thermally treating the poly(hydroxyamide) (PHA, 8), as depicted in Reaction Scheme 3 below:

Reaction Scheme 3

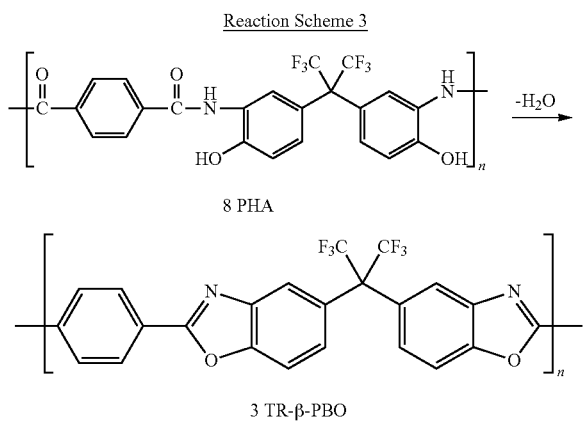

The thermal treatment is carried out at 150 to 400° C., preferably 250 to 350° C., at a heating rate of 1 to 10° C./min, for 30 minutes to 12 hours, preferably for 30 minutes to 2 hours, under an inert atmosphere.

The precursor poly(hydroxyamide) (PHA, 8) is prepared by reacting terephthaloyl chloride (TCL, 6) with 2,2'-bis(3-amino-4-hydroxyphenyl)hexafluoropropane (bisAPAF, 7), as depicted in Reaction Scheme 4 below:

Reaction Scheme 4

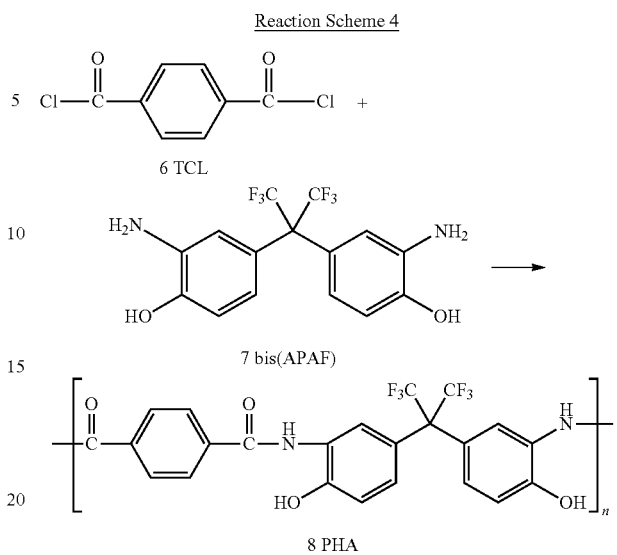

The reaction is carried out at −10 to 60° C. for 30 minutes to 12 hours until the reaction is thoroughly completed.

In addition, an acid acceptor is added to capture HX (hydrogen halide, e.g., HCl) produced during the reaction. The acid acceptor is selected from the group consisting of ethylene oxide, propylene oxide, magnesium oxide, hydrotalcite, magnesium carbonate, calcium hydroxide, magnesium silicate and combinations thereof. Preferably, an excess of the acid acceptor is used, as compared to HX, the reaction product.

The polybenzoxazole (TR-β-PBO, 3) prepared by thermal treatment as mentioned above has a glass transition temperature (Tg) of 377° C., a d-spacing of 6.0 to 6.10 Å and a rigid rod-type structure.

The polybenzoxazole (TR-β-PBO, 3) of the present invention is prepared from the poly(hydroxyamide) precursor and thus has mechanical and morphological properties different from conventional polybenzoxazole (conventionally known as TR-α-PBO) (See Table 2).

That is to say, the TR-α-PBO is prepared by thermally treating polyimide as a precursor. Tg of the TR-α-PBO is impossible to measure. On the other hand, Tg of the TR-β-PBO of the present invention is observed at 377° C., as mentioned above. The observable Tg means that the TR-β-PBO has soft polymeric chains, which affects mechanical properties such as tensile strength and elongation.

Furthermore, the TR-β-PBO has a superior fractional free volume (FFV) property and a d-spacing of 6.0 to 6.10 Å, preferably 6.02 Å, which is different from the d-spacing (i.e., 6.25 Å) of TR-α-PBO. The difference in d-spacing affects gas permeability and selectivity when used for gas separation membranes.

Consequently, the conventional TR-α-PBO and the present TR-β-PBO have identical repeating units, but have different physical properties, thus providing greatly different effects when used for gas separation membranes. This is achieved by thermally treating the present precursor in the range of specific temperatures.

Preferably, the thermal treatment is carried out at 150 to 450° C., preferably 250 to 350° C., at a heating rate of 1 to 10° C./min, for 5 minutes to 12 hours, preferably for 10 minutes to 2 hours, under an inert atmosphere. When the temperature is less than the level as defined the above, thermal rearrangement does not proceed to completion, thus leaving precursor residues, which reduces purity. Exceeding the temperature as defined above provides no significant advantage and is this economically disadvantageous. Accordingly, the thermal treatment is properly carried out within the temperature range as defined above.

In particular, the gas separation membrane comprising the TR-β-PBO of Formula 3 is prepared by a conventional method. In one embodiment, the method comprises reacting terephthaloyl chloride (TCL) with 2,2'-bis(3-amino-4-hydroxyphenyl)hexafluoropropane (bisAPAF) to prepare poly(hydroxyamide) (PHA); casting the poly(hydroxyamide) (PHA) on a substrate, followed by drying, to prepare a precursor membrane; and thermally treating the precursor membrane.

The drying is carried out at 50 to 200° C. for 30 minutes to 5 hours. The thermal treatment is carried out at 150 to 450° C., preferably at 250 to 350° C., at a heating rate of 1 to 10° C./min, for 5 minutes to 12 hours, preferably for 10 minutes to 2 hours under an inert atmosphere.

The TR-β-PBO gas separation membrane thus prepared exhibits superior physical properties (e.g., tensile strength of 85 to 90 MPa and elongation of 5 to 10%).

The TR-β-PBO gas separation membrane is useful as a gas separation membrane applicable to gas pair such as $H_2/CH_4$, $H_2/CO_2$, $H_2/N_2$, $He/N_2$, $O_2/N_2$, $CO_2/N_2$, and $CO_2/CH_4$, preferably, as gas separation membranes applicable to gas pair such as $H_2/CH_4$, $H_2/CO_2$, $H_2/N_2$, and $He/N_2$, including small gases such as $H_2$ or He. Due to polymeric microporous properties thereof, the TR-β-PBO gas separation membrane has high selectivity for small gas series, which cannot be realized by conventional TR-α-PBO membranes (See. Tables 6 and 7).

Mode for Invention

Hereinafter, preferred examples will be provided for a further understanding of the invention. These examples are for illustrative purposes only and are not intended to limit the scope of the present invention.

Example 1

Preparation of polybenzoxazole (TR-β-PBO) Separation Membrane

TR-β-PBO represented by Formula 3 below was prepared through the following reaction.

Formula 3

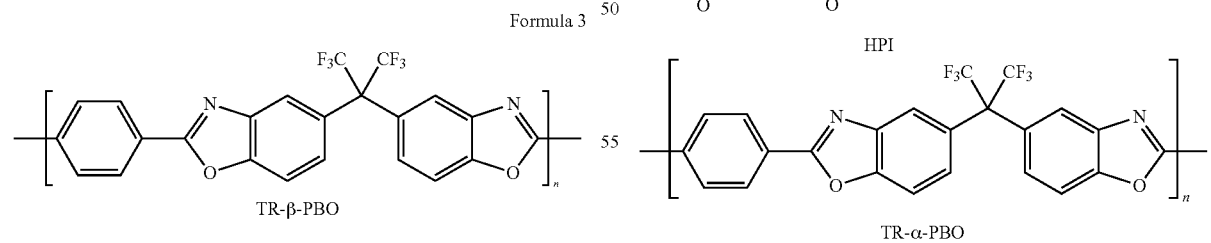

TR-β-PBO 2,2'-bis(3-amino-4-hydroxyphenyl)hexafluoropropane (bisAPAF, 3.663 g, 10 mmol) and NMP (15.06 mL) were charged into a 100 mL 3-neck flask under nitrogen purging and the mixture was placed into an ice bath at 0° C. Subsequently, a solution of propylene oxide (PO, 0.3 mL) and terephthaloyl chloride (TCL, 2.030 g, 10 mmol) in NMP (8.35 mL) was added to the mixture and then allowed to proceed for 2 hours.

The resulting mixture was stirred for 12 hours under an inert atmosphere to obtain a viscous poly(hydroxyamide) (PHA) solution.

The solution was cast onto a glass substrate and dried at 100° C. for one hour and at 200° C. for 10 hours to remove the solvent, thereby obtaining a PHA precursor membrane.

The PHA precursor membrane was thermally treated at 350° C. at a heating rate of 5° C./min for one hour under an Ar atmosphere and was then allowed to slowly cool to ambient temperature to prepare a polybenzoxazole (TR-β-PBO) separation membrane.

Comparative Example 1

Preparation of polybenzoxazole (TR-α-PBO) Separation Membrane

TR-α-PBO was prepared in accordance with the following Reaction Scheme 5.

Reaction Scheme 5

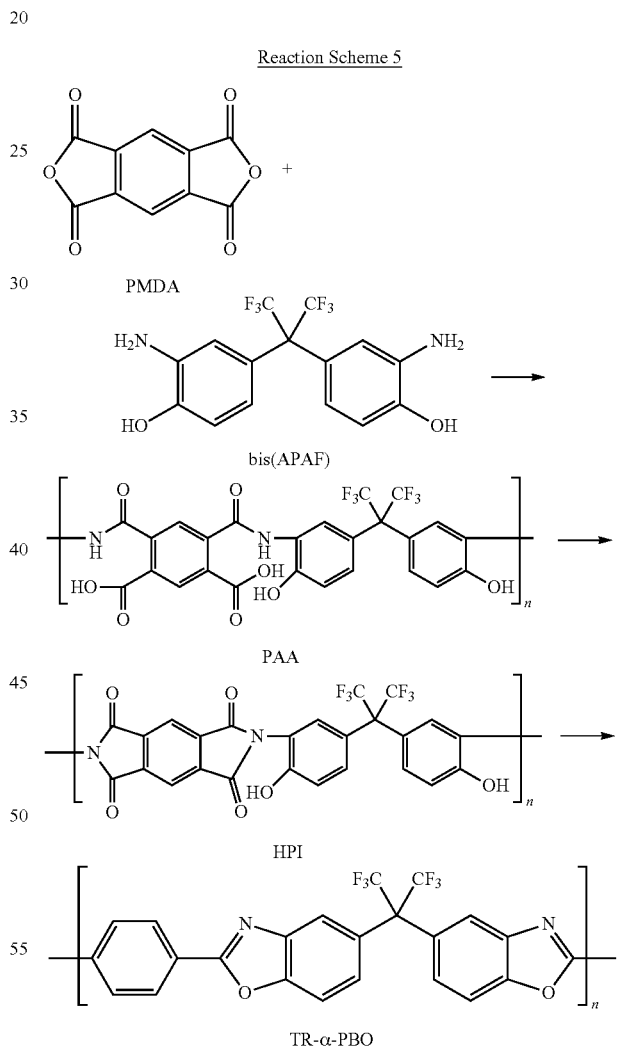

BisAPAF (3.663 g, 10 mmol) and NMP (21.34 mL) were charged into a 100 mL 3-neck flask under nitrogen purging. A solution of 1,2,4,5-benzenetetracarboxylic dianhydride (PMDA, 2.181 g, 10 mmol) in NMP (12.71 mL) was added thereto.

The mixture was allowed to react at ambient temperature for 5 hours to obtain a viscous yellow solution. The reaction was allowed to proceed for an additional 12 hours to obtain a polyamic acid (PAA) solution.

The polyamic acid (PAA) solution was cast onto a glass substrate and then thermally treated at 100° C. for one hour and at 300° C. for one hour under reduced pressure to remove the solvent, thereby obtaining a hydroxy-containing polyimide (HPI) precursor membrane.

The HPI precursor membrane was thermally treated at 450° C. with a heating rate of 5° C./min for one hour under an Ar atmosphere and was then allowed to slowly cool to ambient temperature to obtain a polybenzoxazole (TR-α-PBO) separation membrane.

ing evolution of $CO_2$ are plotted at about 450° C. (represented by reference numeral c in FIG. 1).

These TGA-MS results show that all TR-α-PBO and TR-β-PBO membranes are thermally stable up to a maximum 500° C.

Experimental Example 2

FT-IR Analysis

The PHA precursor membrane and TR-β-PBO membrane of Example 1, and HPI precursor membrane and TR-α-PBO

TABLE 1

| | Example 1 | Comparative Example 1 |
|---|---|---|
| Heating conditions | 350° C., 1 hour | 450° C., 1 hour |
| Intermediate | PHA | HPI |
| Finally produced PBO | TR-β-PBO | TR-α-PBO |

The physical properties were evaluated for TR-β-PBO and TR-α-PBO separation membranes prepared in Example 1 and Comparative Example 1 and precursor membranes thereof.

Experimental Example 1

Thermogravimetric Analysis/Mass Spectroscopy (TGA-MS)

The PHA precursor membrane of Example 1 and the HPI precursor membrane of Comparative Example 1 were subjected to TGA-MS to confirm dehydration and $CO_2$ evolution. The TGA-MS for each precursor membrane was carried out using TG 209 F1 Iris and QMS 403C Aeolos (NETZSCH, Germany). The results thus obtained are shown in FIG. 1.

FIG. 1 is a graph showing TGA-MS results of the PHA precursor membrane of Example 1 and the HPI precursor membrane of Comparative Example 1.

As can be confirmed from FIG. 1, the PHA precursor membrane of Example 1 undergoes weight loss at 250 to 350° C. (represented by reference numeral a' in FIG. 1) corresponding to the temperature at which thermal conversion from PHA to TR-β-PBO occurs, and MS peaks indicating dehydration (removal of $H_2O$) are plotted at 300° C. (represented by reference numeral b in FIG. 1). On the other hand, it can be confirmed from FIG. 1 that the HPI precursor membrane of Comparative Example 1 undergoes weight loss at 350 to 450° C. (represented by reference numeral b in FIG. 1) corresponding to the temperature at which thermal conversion from PHA to TR-β-PBO occurs, and MS peaks indicatmembrane of Comparative Example 1 were subjected to FT-IR analysis to confirm characteristic peaks. FT-IR spectra were obtained using a Nicolet Magna IR 860 instrument (thermo Nicolet, Madison, Wis., USA). The results thus obtained are shown in FIGS. 2(a) and 2(b).

FIG. 2(a) is FT-IR spectra of the HPI precursor membrane and the TR-α-PBO membrane of Comparative Example 1. FIG. 2(b) is FT-IR spectra of the PHA precursor membrane and TR-β-PBO membrane of Example 1.

As can be seen from FIGS. 2(a) and 2(b), broad bands (a and f) by O—H stretching of HPI and PHA are observed at 3,700 to 2,500 $cm^{-1}$.

As apparent from FIG. 2(a), the HPI precursor membrane shows characteristic absorption bands of imide groups at 1,729 $cm^{-1}$ (C=O stretching, c) and 1,781 $cm^{-1}$ (C=O stretching, b), and as apparent from FIG. 2(b), the PHA precursor membrane shows characteristic absorption peaks of amide groups at 1,650 $cm^{-1}$ (C=O stretching, g) and 1,530 $cm^{-1}$ (N—H bending, h).

In addition, after thermal conversion into PBO, all of the TR-α-PBO and TR-β-PBO membranes show peaks corresponding to benzoxazole rings at 1,058 $cm^{-1}$ (C—O stretching, e, j), 1,480 $cm^{-1}$ and 1,558 $cm^{-1}$ (C=N stretching, d, i).

Experimental Example 3

Element Analysis

The PHA precursor membrane and TR-β-PBO membrane of Example 1, and the HPI precursor membrane and the TR-α-PBO membrane of Comparative Example 1 were subjected to element analysis (EA) to confirm elements present in the membrane. The element analysis was carried out using an elemental analyzer (Flash EA 1112, CE Instruments, UK).

The results thus obtained are shown in Table 2 below.

TABLE 2

| | Type | Formula | C (wt. %) | H(wt. %) | N(wt. %) |
|---|---|---|---|---|---|
| Exam. 1 | PHA precursor membrane | $[C_{23}H_{14}F_6N_2O_4]_n$ | 54.06 ± 0.10 (55.7)* | 2.73 ± 0.12 (2.84)* | 5.75 ± 0.13 (5.64)* |
| | TR-β-PBO membrane | $[C_{23}H_{10}F_6N_2O_2]_n$ | 60.33 ± 0.04 (60.0)* | 2.15 ± 0.08 (2.19)* | 6.01 ± 0.05 (6.09)* |
| Comp. Exam. 1 | HPI precursor membrane | $[C_{23}H_{10}F_6N_2O_6]_n$ | 53.3 ± 0.04 (54.8)* | 1.91 ± 0.04 (1.84)* | 4.92 ± 0.02 (5.11)* |
| | TR-α-PBO membrane | $[C_{23}H_{10}F_6N_2O_2]_n$ | 60.52 ± 0.05 (60.0)* | 2.05 ± 0.06 (2.19)* | 6.14 ± 0.07 (6.09)* |

*Theoretical values

Experimental Example 4

Differential Scanning Calorimetry (DSC) Analysis

The PHA precursor membrane and the TR-β-PBO membrane of Example and the HPI precursor membrane and the TR-α-PBO membrane of Comparative Example 1 were subjected to DSC analysis to measure glass transition temperatures (Tg) thereof. The DSC analysis was carried out using a DSC-2010 TA Instruments system at a heating rate of 20° C./min under an $N_2$ atmosphere. The results thus obtained are shown in FIG. 3.

FIG. 3 is DSC thermograms of PHA precursor membrane and TR-β-PBO membrane Example 1 and the HPI precursor membrane and TR-α-PBO membrane of Comparative Example 1.

As can be seen from FIG. 3, Tg of the PHA precursor membrane and the TR-β-PBO membrane were observed at 281° C. and 377° C., respectively. This behavior is attributed to the rigid rod structure of benzoxazole. In addition, Tg of the HPI precursor membrane was observed at 353° C. However, Tg of TR-α-PBO membrane obtained therefrom cannot be measured.

These results indicated that TR-β-PBO membrane chains are softer and more flexible than TR-α-PBO membrane chains.

Experimental Example 5

Analysis of Tensile Strength and Elongation

The tensile strength and elongation were measured for the PHA precursor membrane and TR-β-PBO membrane of Example 1 and HPI precursor membrane and TR-α-PBO membrane of Comparative Example 1. For measurement of the physical properties, five specimens for respective membranes with a width of 0.5 cm, a length of 4 cm and a thickness of 60-70 μm were prepared. The physical properties were characterized to study stress-strain behavior of the polymer samples using an Autograph AGS-J (Shimadzu, Kyoto, Japan). The results thus obtained are shown in Table 3 below:

TABLE 3

| | Type | Tensile strength (MPa) | Elongation (%) |
|---|---|---|---|
| Ex. 1 | PHA precursor membrane | 63 | 2.3 |
| | TR-β-PBO precursor membrane | 87 | 6.0 |
| Comp. Ex. 1 | HPI precursor membrane | 62 | 2.7 |
| | TR-α-PBO precursor membrane | 69 | 3.4 |

As can be seen from Table 3 above, the polybenzoxazole membrane shows increased tensile strength and elongation, as compared to precursor membranes. In particular, the TR-β-PBO membrane according to Example 1 of the present invention has even higher tensile strength and elongation than the TR-α-PBO membrane of Comparative Example 1. This means that the membranes prepared by the method according to the present invention are more flexible and have higher strength.

Experimental Example 6

Wide Angle X-ray Diffraction Pattern Analysis

The PHA precursor membrane and the TR-β-PBO membrane of Example and the HPI precursor membrane and the TR-α-PBO membrane of Comparative Example 1 were subjected to wide-angle X-ray diffraction (WAXD) analysis to confirm morphologies thereof. The analysis was carried out using a wide angle X-ray diffractometer (D/MAX-2500, Rigaku, Japan).

FIG. 4(a) is X-ray diffraction patterns of the HPI precursor membrane and the TR-α-PBO membrane of Comparative Example 1. FIG. 4(b) is X-ray diffraction patterns of the PHA precursor membrane and the TR-β-PBO membrane of Example 1.

Figure 4:
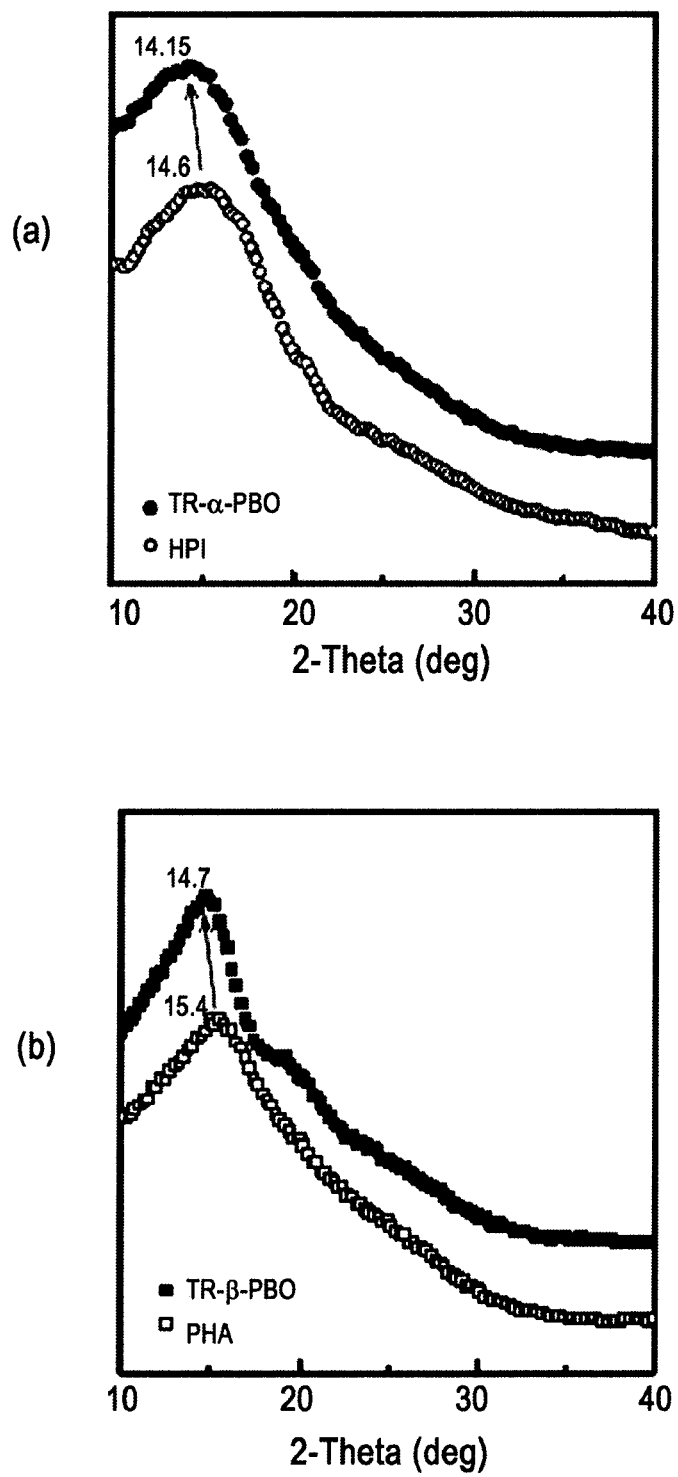

As can be seen from FIG. 4, all of the membranes show broad patterns, meaning that they have an amorphous structure. In addition, after the thermal conversion from the HPI precursor membrane to the TR-α-PBO membrane, the peak center (2θ) shifts from 14.6 to 14.15 degrees, and after thermal conversion from the PHA precursor membrane to the TR-β-PBO membrane, the peak center (2θ) shifts from 15.4 to 14.7 degrees.

Experimental Example 7

Measurement of Free Volume-Related Physical Properties

The physical properties were measured for the PHA precursor membrane, TR-β-PBO membrane of Example 1 and the HPI precursor membrane and the TR-α-PBO membrane of Comparative Example 1. The results thus obtained are shown in Table 4 below.

First, the density of the membranes was measured by a buoyancy method using a Sartorius LA 120S analytical balance. The fractional free volume (FFV, Vf) was calculated from the data in accordance with Equation 1 below [W. M. Lee. Selection of barrier materials from molecular structure. *Polym Eng Sci.* 1980, 20, 65-9].

$$FFV = \frac{V - 1.3Vw}{V} \qquad \text{Equation 1}$$

wherein V is the polymer specific volume and $V_w$ is the specific Van der Waals volume. The Van der Waals volume was estimated by a Cerius 4.2 program using a synthia module based on the work of J. Bicerano [J. Bicerano. Prediction of polymer properties, Third Edition. Marcel Dekker Inc. 2002].

The d-spacing was calculated in accordance with Bragg's equation from X-ray diffraction pattern results.

TABLE 4

|  | Type | Density (g/cm³) | V (cm³/g) | $V_{wb}$ (cm³/g) | $V_f$ (FFV) | Increment in $V_f$(%) | D-spacing (Å) |
|---|---|---|---|---|---|---|---|
| Ex. 1 | PHA precursor membrane | 1.450 | 0.690 | 0.462 | 0.129 |  | 5.75 |
|  | TR-β-PBO membrane | 1.413 | 0.708 | 0.444 | 0.184 | +43 | 6.02 |
| Comp. Ex. 1 | HPI precursor membrane | 1.478 | 0.667 | 0.443 | 0.148 |  | 6.06 |
|  | TR-α-PBO membrane | 1.362 | 0.734 | 0.457 | 0.190 | +28 | 6.25 | b: value measured with MS modeling software 4.0

As can be seen from Table 4, in the case of Comparative Example 1, the density of the thermally converted TR-α-PBO membrane was considerably lower than that of the HPI precursor membrane due to the evolution of $CO_2$ generated during thermal conversion, and in the case of Example 1, the density of the thermally converted TR-β-PBO membrane was slightly lower than that of the PHA precursor membrane due to dehydration during thermal conversion.

Furthermore, $V_f$ of thermally converted PBOs is higher than those of respective precursors due to thermal rearrangement in a solid state. The TR-β-PBO membrane shows a slightly lower $V_f$ than the TR-α-PBO membrane, but there is no significant difference in $V_f$ between the membranes.

As can be seen from Table 4, the d-spacing of the PHA precursor membrane and the TR-β-PBO membrane are substantially lower than those of the HPI precursor membrane and TR-α-PBO membrane. The decrease in d-spacing affects pores and free volume elements, allowing permeation of smaller gas molecules.

Experimental Example 8

Molecular Dynamics (MD) Simulation of Gas Sorption

The PHA and HPI precursor membranes and PBO polymer membrane were simulated using the computer program Materials Studio modeling to confirm gas adsorption properties. The 4.2 COMPASS force field (Condensed-phase Optimized Molecular Potentials for Atomistic Simulation Studies) was used in all the simulations. Molecular dynamics (MD) were calculated using the Amorphous Cell module of the MS program. The $O_2$ and $N_2$ sorption amounts were also calculated from a sorption module allowing simulation of absorption of pure sorbate. Adsorption isotherms obtained from constant-pressure simulations for $O_2$ and $N_2$ are shown in FIG. 5.

Figure 5:
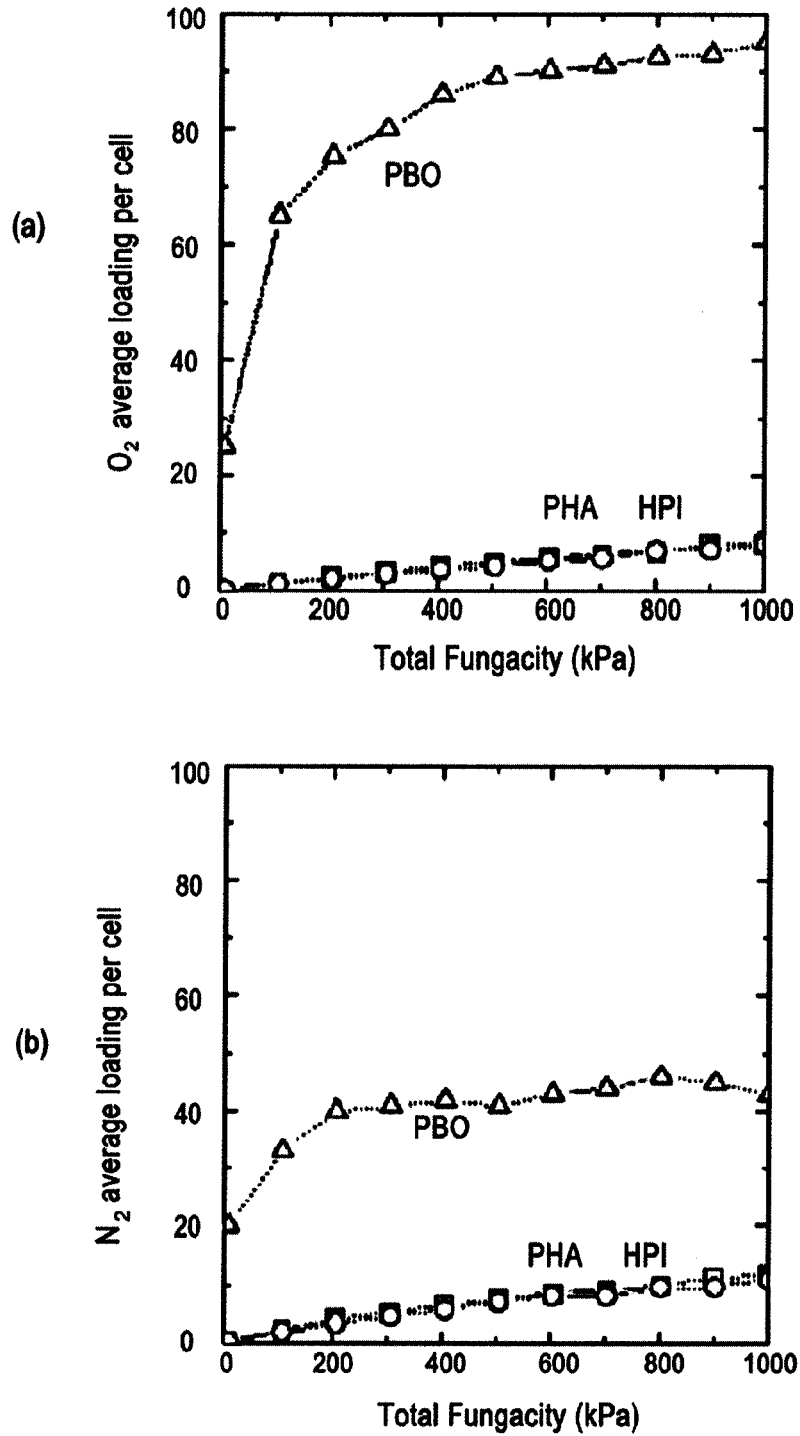

FIG. 5(*a*) is adsorption isotherms of constant-pressure simulations for $O_2$. FIG. 5(*b*) is adsorption isotherms of constant-pressure simulations for $N_2$.

As can be seen from FIGS. 5(*a*) and 5(*b*), in the case of the HPI and PHA precursor membranes, average $O_2$ and $N_2$ loading per cell was about 10 to 1,000 kPa due to their low fractional free volume contents. In contrast, the PBO membrane showed extremely high gas loadings around low fugacity region. These results, obtained from molecular simulations, indicate that the PBO separation membranes can sufficiently accumulate gas molecules therein.

Experimental Example 9

Nitrogen Adsorption and Desorption Analysis

The PHA precursor membrane and the TR-β-PBO membrane of Example and the HPI precursor membrane and the TR-α-PBO membrane of Comparative Example 1 were subjected to $N_2$ adsorption/desorption experiments. The BET adsorption isotherms for $N_2$ at 77K were determined using a Micrometrics ASAP 2020 surface area and porosity analyzer (Atlanta, USA). The adsorbents were degassed at 200° C. overnight before the adsorption measurements. The specific surface areas, $S_{BET}$, were calculated from the linear form of the Brunauer—Emmett—Teller (BET) equation.

FIG. 6 is $N_2$ adsorption/desorption isotherms at −195° C. for the HPI precursor membrane (a) and the TR-α-PBO membrane (b) of Comparative Example 1, and the PHA precursor membrane (c) and the TR-β-PBO membrane (d) of Example 1.

As can be seen from FIG. 6, all the TR-α-PBO and TR-β-PBO membranes show a higher nitrogen volume than those of their precursor membranes. This means that the thermally treated PBO membranes have increased pore size, as compared to precursor membranes.

As mentioned above, the TR-PBO membranes induced by the precursors, HPI and PHA, have larger microcavities than those of the precursors. In particular, as apparent from Tables 1 to 3 and FIGS. 1 to 6, there are differences in properties between TR-β-PBO using PHA as the precursor and TR-α-PBO using HPI as the precursor. Furthermore, the TR-β-PBO membranes have a lower d-spacing than the TR-α-PBO membranes, thus enabling efficient separation of gas pair including small gases.

Experimental Example 10

Gas Permeability and Permselectivity Analysis

For the PHA precursor membrane and TR-β-PBO membrane of Example 1 and the HPI precursor membrane and the TR-α-PBO membrane of Comparative Example 1, permeability and permselectivity for various gases were measured.

The gas permeability was measured with high vacuum time-lag equipment using single gases (1 bar, 25° C.). Five samples with a thickness 30 μm for respective membranes were used. The results thus obtained are shown in Table 5 below.

TABLE 5

| | | | | | Gas permeability | | | |
| --- | --- | --- | --- | --- | --- | --- | --- | --- |
| | Gas permeability (size) (Barrer$^a$) | | $O_2$ (3.46 Å) | $N_2$ (3.64 Å) | $CO_2$ (3.36 Å) | $H_2$ (2.89 Å) | He (2.6 Å) | $CH_4$ (3.80 Å) |
| Ex. 1 | PHA precursor membrane | | 1 | 0.2 | 4 | 15 | 24 | 0.1 |
| | TR-β-PBO membrane | | 15 | 3 | 58 | 114 | 121 | 2 |
| Comp. Ex. 1 | HPI precursor membrane | | 4 | 1 | 17 | 43 | 62 | 0.2 |
| | TR-α-PBO membrane | | 148 | 34 | 952 | 635 | 421 | 23 |

(Barrer$^a$): $10^{-10}$ (cm$^3$(STP)cm/cm$^2$scmHg)

TABLE 6

| | | | | Gas selectivity | | | | |
| --- | --- | --- | --- | --- | --- | --- | --- | --- |
| | Type | | $O_2/N_2$ | $H_2/N_2$ | $CO_2/N_2$ | $He/N_2$ | $H_2/CH_4$ | $CO_2/CH_4$ |
| Ex. 1 | PHA precursor membrane | | 6 | 89 | 25 | 136 | 186 | 52 |
| | TR-β-PBO membrane | | 5 | 39 | 20 | 42 | 58 | 30 |
| Comp. Ex. 1 | HPI precursor membrane | | 7 | 78 | 31 | 113 | 200 | 80 |
| | TR-α-PBO membrane | | 4 | 19 | 28 | 13 | 27 | 41 |

As can be seen from Table 5 above, gas permeabilities or the TR-β-PRO and TR-α-PBO membranes were significantly higher than those of the precursor membranes.

As apparent from Table 6, when $H_2/CH_4$, $H_2/N_2$, $He/N_2$ and $O_2/N_2$ are separated, in terms of selectivity, the precursor membranes are superior to PBO membranes, but the TR-β-PBO membrane is still higher than TR-α-PBO membrane.

Useful separation membranes must be selected, taking into consideration the permeability and selectivity. In this regard, the TR-β-PBO membrane prepared according to the present invention exhibits superior permeability and selectivity, and in particular is more effective in separating small gases such as $H_2$ and He.

Experimental Example 11

Hydrogen Mix Gas Permeability Analysis

The hydrogen permeability and selectivity of the TR-β-PBO membrane according to the present invention and conventional polymer separation membranes were measured at 30° C. The results thus obtained are shown in Table 7 below:

TABLE 7

| Polymer | $H_2$ permeability (Barrers[b]) | Selectivity | | | |
|---|---|---|---|---|---|
| | | $H_2/N_2$ | $H_2/CH_4$ | $H_2/CO_2$ | $H_2/CO$ |
| TR-β-PBO | 114 | 39 | 58 | 2 | 37 |
| TR-α-PBO | 635 | 19 | 27 | 0.7 | 12 |
| Celluose acetate | 3 | 12.5 | 12.4 | 0.4 | — |
| Ethyl cellulose | 87 | 27.2 | 4.6 | 3.3 | — |
| Polybenzimidazole | 0.09 | — | — | 9 | — |
| Polyetherimide | 8 | 166 | 222.9 | 5.9 | — |
| Polydimethylsiloxane | 375 | 1.3 | 0.6 | 0.3 | — |
| Polyimide(Matrimid) | 28 | 87.8 | 112.4 | 2.6 | — |
| Polymethylmetacrylate | 2 | 2 | 4 | 4 | — |
| Polymethylpentene | 125 | 18.7 | 8.4 | 1.5 | — |
| Polyphenyleneoxide | 113 | 29.7 | 10.3 | 1.5 | — |
| Polystyrene | 24 | 39.7 | 29.8 | 2.3 | 12 |
| Polysulfone | 12 | 15.1 | 30.3 | 2 | 38 |
| Polyvinyl acetate | 15 | 11.6 | 16.8 | 1.2 | — |

(Barrer[a]): $10^{-10}$ $(cm^3(STP)cm/cm^2 scmHg)$

As can be seen from Table 7, the TR-β-PBO polymers according to the present invention exhibit superior hydrogen permeability and selectivity for gas pair, as compared to other polymers, thus being useful for separation membranes.

Experimental Example 12

Analysis of Correlation between Permeability and Selectivity

The $H_2$ permeability and selectivity for $H_2/N_2$ and $H_2/CH_4$ of the TR-β-PBO membrane according to the present invention and conventional polymer membrane were measured. The results thus obtained are shown in FIGS. 7(a) and 7(b).

FIG. 7(a) is a graph showing $H_2$ permeability-$H_2/N_2$ selectivity of the TR-β-PBO membrane and conventional polymer membranes and FIG. 7(b) is a graph showing $H_2$ permeability-$H_2/CH_4$ selectivity of the TR-β-PBO membrane and conventional polymer membranes.

As can be seen from FIGS. 7(a) and 7(b), the TR-β-PBO membrane according to the present invention exhibits superior permeability and selectivity, as compared to conventional polymer membranes.

INDUSTRIAL APPLICABILITY

As apparent from the foregoing, the benzoxazole-based polymers according to the present invention are suitable for use in various separation membranes, in particular, separation membranes applicable to small gases.

The invention claimed is:
1. A method for preparing a benzoxazole-based polymer represented by Formula 1 comprising:
preparing a poly(hydroxyamide) of Formula 2 by reacting a compound of Formula 4 with a compound of Formula 5, as depicted in Reaction Scheme 2 below:

Reaction Scheme 2

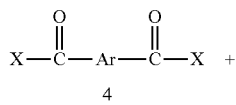

4

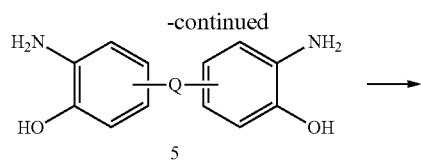

5

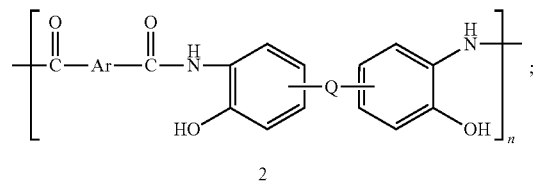

2 and
thermally treating the poly(hydroxyamide) of Formula 2, as depicted in Reaction Scheme 1 below:

Reaction Scheme 1 wherein Ar is a bivalent C5-C24 arylene group or a bivalent C5-C24 heterocyclic ring, which is substituted or unsubstituted with at least one substituent selected from the group consisting of C1-C10 alkyl, C1-C10 alkoxy, C1-C10 haloalkyl and C1-C10 haloalkoxy, or two or more of which are fused together to form a condensation ring, or covalently bonded to each other via a functional group selected from the group consisting of O, S, C(=O), CH(OH), S(=O)2, Si(CH3)2, (CH2)p (in which 1≤p≤10), (CF2)q (in which 1≤q≤10), C(CH3)2, C(CF3)2 and C(=O)NH;

Q is O, S, C(=O), CH(OH), S(=O)2, Si(CH3)2, (CH2)p (in which 1≤p≤10), (CF2)q (in which 1≤q≤10), C(CH3)2, C(CF3)2, C(=O)NH, C(CH3)(CF3), C1-C6 alkyl-substituted phenyl or C1-C6 haloalkyl-substituted phenyl in which Q is linked to opposite both phenyl rings in the position of m-m, m-p, p-m or p-p;

n is an integer of 20 to 200;

X is a halogen atom; and an acid acceptor is added during the reaction scheme 2.

2. The method according to claim 1, wherein Ar is selected from the following compounds:

wherein X is O, S, C(=O), CH(OH), S(=O)$_2$, Si(CH$_3$)$_2$, (CH$_2$)$_p$ (in which 1≤p≤10), (CF$_2$)$_q$ (in which 1≤q≤10), C(CH$_3$)$_2$, C(CF$_3$)$_2$, or C(=O)NH; Y is O, S or C(=O); and Z$_1$, Z$_2$ and Z$_3$ are identical or different and are O, N or S.

3. The method according to claim 1, wherein Ar is selected from the following compounds:

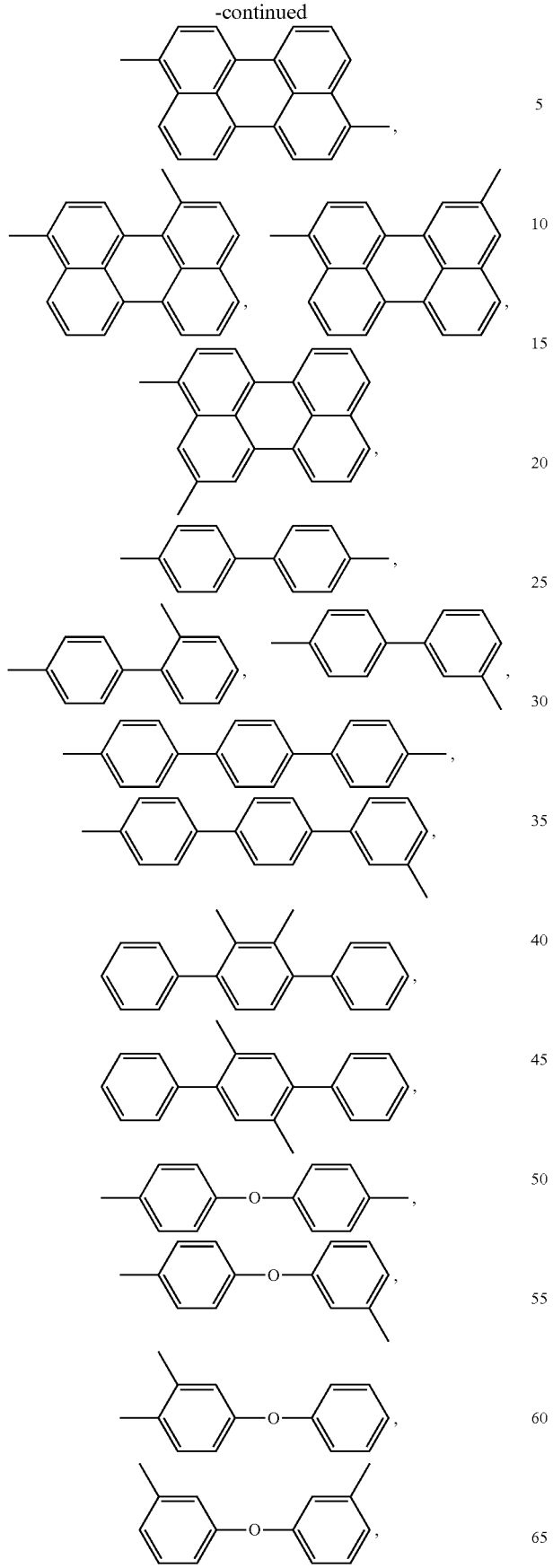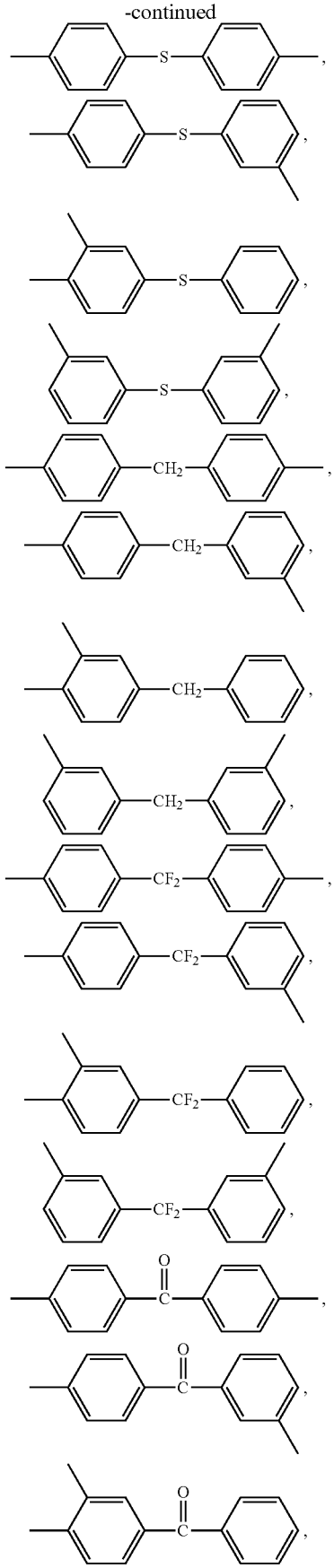

33
-continued
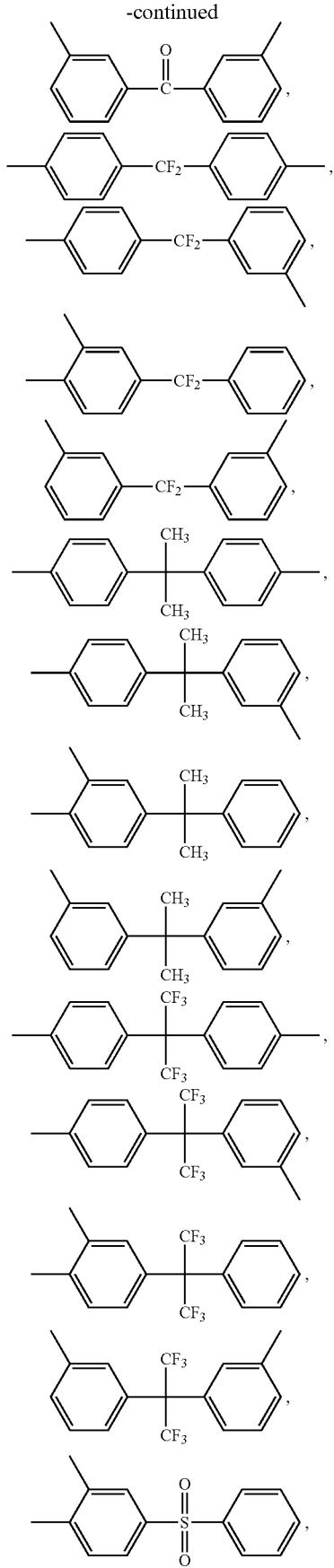
34
-continued
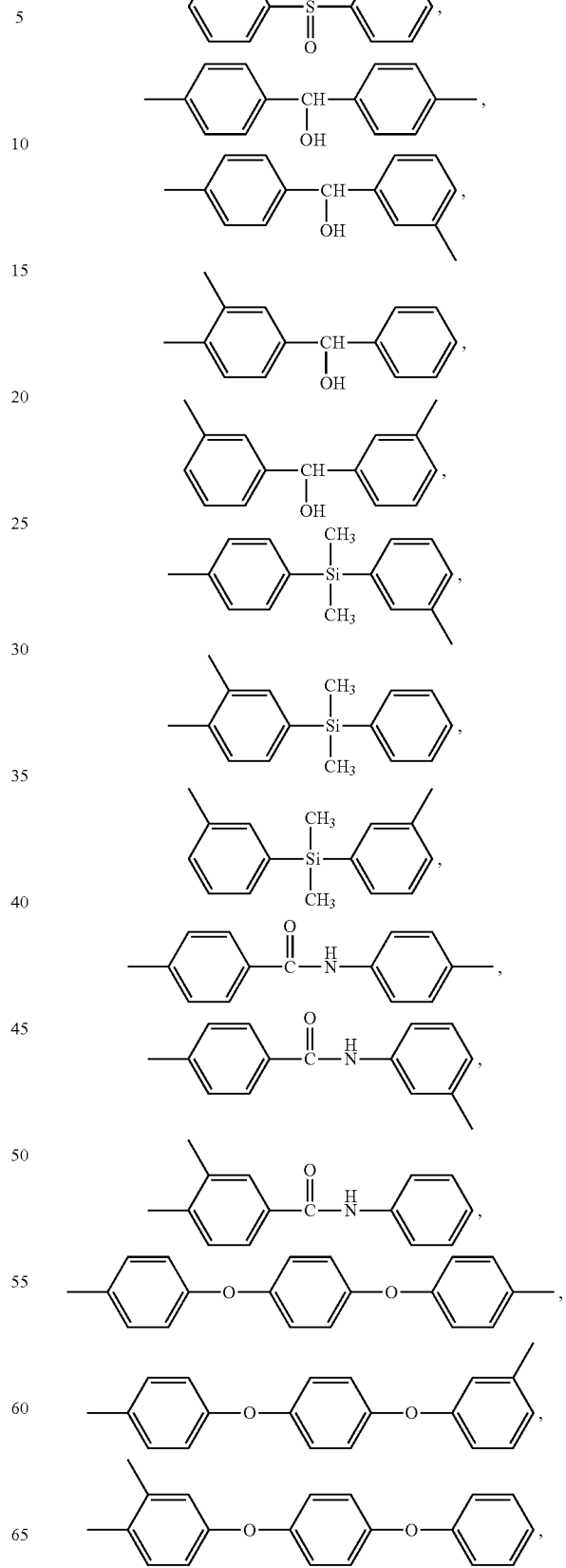

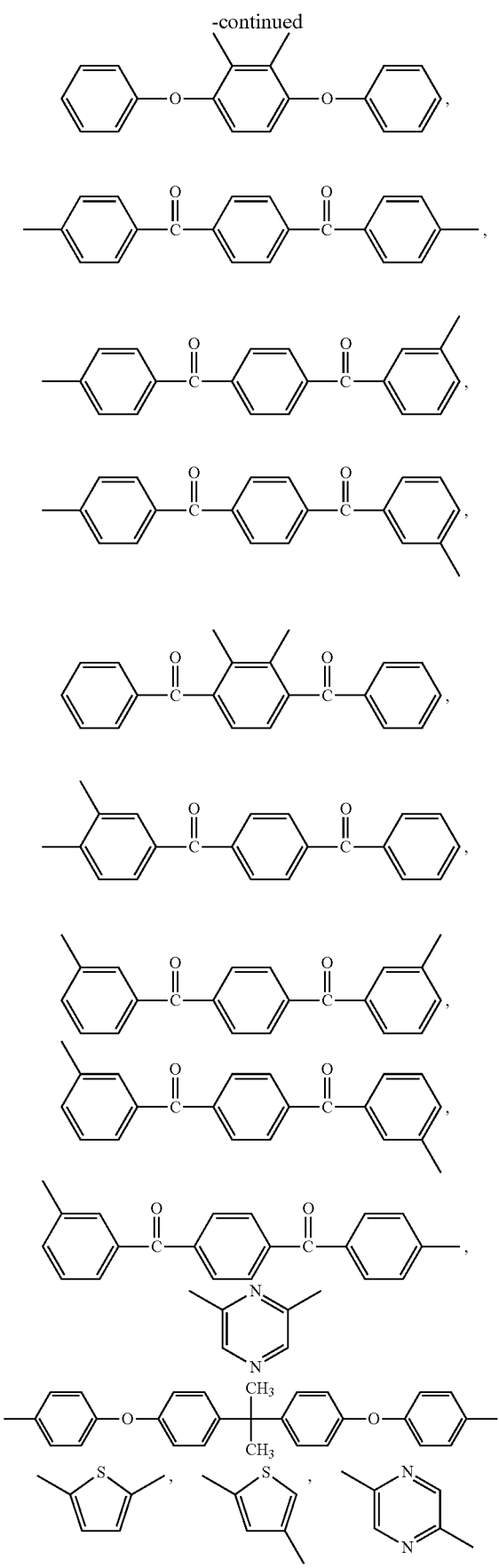

4. The method according to claim 1, wherein Q is $C(CH_3)_2$, $C(CF_3)_2$, $C(=O)NH$, $C(CH_3)(CF_3)$,

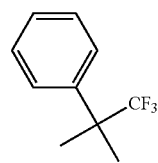

or

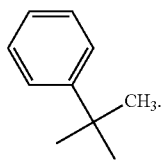

5. The method according to claim 1, wherein Ar is

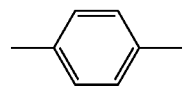

and Q is $C(CF_3)_2$.

6. The method according to claim 1, wherein the thermal treatment is carried out at 150 to 450° C. for 5 minutes to 12 hours.

7. The method according to claim 1, wherein the thermal treatment is carried out at 250 to 350° C. for 10 minutes to 2 hours.

8. The method according to claim 1, wherein the thermal treatment is carried out by heating at a heating rate of 1 to 10° C./min.

9. The method according to claim 1, wherein the poly(hydroxyamide) of Formula 2 is prepared by reacting a compound of Formula 4 with a compound of Formula 5, as depicted in Reaction Scheme 2 below:

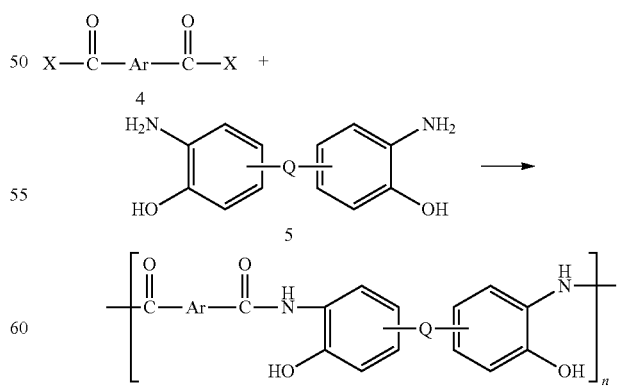

wherein X is a halogen atom, and Ar, Q and n are defined as above.

10. The method according to claim 9, wherein the halogen atom is F, Cl, Br or I.

11. The method according to claim 9, wherein the reaction is carried out at −10 to 60° C. for 30 minutes to 12 hours.

12. The method according to claim 9, wherein an acid acceptor is added during the reaction.

13. The method according to claim 12, wherein the acid acceptor is selected from the group consisting of ethylene oxide, propylene oxide, magnesium oxide, hydrotalcite, magnesium carbonate, calcium hydroxide, magnesium silicate and combinations thereof.

* * * * *